(12) United States Patent
Mondal et al.

(10) Patent No.: US 9,776,847 B2
(45) Date of Patent: Oct. 3, 2017

(54) COMPREHENSIVE WORKSITE AND TRANSPORTATION SAFETY SYSTEM

(71) Applicant: Recon Dynamics, LLC, Kirkland, WA (US)

(72) Inventors: Indrasis Mondal, Bothell, WA (US); K. Deric Eldredge, West Jordan, UT (US); Eric Ryan Clausen-Brown, Kirkland, WA (US); Martin Jay Feuerstein, Woodinville, WA (US); Nicholas Lee Smith, Sandy, UT (US); Adrian Men-Gee Yip, Snohomish, WA (US); William Dale Webster, Jr., Riverton, UT (US); Douglas Neal Morrison, Kirkland, WA (US)

(73) Assignee: RECON DYNAMICS, LLC, Kirkland, WA (US)

( * ) Notice: Subject to any disclaimer, the term of this patent is extended or adjusted under 35 U.S.C. 154(b) by 79 days.

(21) Appl. No.: 14/883,479

(22) Filed: Oct. 14, 2015

(65) Prior Publication Data

US 2017/0107090 A1 Apr. 20, 2017

(51) Int. Cl.
*B66F 17/00* (2006.01)
*B66F 11/04* (2006.01)
*G07C 5/00* (2006.01)
*G07C 5/08* (2006.01)
*H04W 4/14* (2009.01)
*H04W 84/04* (2009.01)

(52) U.S. Cl.
CPC .......... *B66F 17/006* (2013.01); *B66F 11/044* (2013.01); *G07C 5/008* (2013.01); *G07C 5/0808* (2013.01); *G07C 5/0816* (2013.01); *H04W 4/14* (2013.01); *H04W 84/042* (2013.01)

(58) Field of Classification Search
None
See application file for complete search history.

(56) References Cited

U.S. PATENT DOCUMENTS 6,147,601 A * 11/2000 Sandelman .......... F24F 11/0086
340/12.53
6,265,983 B1 * 7/2001 Baillargeon ....... A62B 35/0037
340/673

(Continued)

*Primary Examiner* — Russell Frejd
(74) *Attorney, Agent, or Firm* — Davis Wright Tremaine LLP

(57) ABSTRACT

Systems and methods for monitoring safety of work vehicles and worksites. Work vehicles and worksites may be provided with target object sensor units for detecting a condition regarding safety determinative aspects of the work vehicle or worksite. The target object sensor units communicate data regarding the safety determinative aspects to a data acquisition and communication unit that produces safety status data. The safety status data is analyzed to determine whether to issue a notification to a notification unit to alert workers of an unsafe condition. The data acquisition and communication unit transmits the safety status data to a server/processing unit for further analysis. The server/processing unit may track the safety status data regarding each worksite or work vehicle and generate statistical data regarding the safety status data. The server/processing unit may communicate with user interface to display notifications and statistical data.

38 Claims, 12 Drawing Sheets

(56) References Cited

U.S. PATENT DOCUMENTS

| | | | | |
|---|---|---|---|---|
| 6,297,744 B1* | 10/2001 | Baillargeon | .......... | B66F 17/006 182/14 |
| 6,330,931 B1* | 12/2001 | Baillargeon | ....... | A62B 35/0037 182/18 |
| 2012/0217091 A1* | 8/2012 | Baillargeon | ........... | G08B 21/02 182/18 |
| 2013/0153333 A1* | 6/2013 | Richards | ............... | B66F 11/044 182/18 |
| 2013/0209109 A1* | 8/2013 | Georgiano | ............ | B66F 11/046 398/140 |
| 2014/0202723 A1* | 7/2014 | Cordani | ................. | A62C 27/00 169/62 |
| 2015/0027808 A1* | 1/2015 | Baillargeon | .......... | B66F 17/006 182/3 |
| 2015/0097674 A1* | 4/2015 | Mondal | ................... | H04W 4/02 340/572.1 |
| 2015/0217981 A1* | 8/2015 | Baillargeon | .......... | B66F 17/006 182/2.8 |

* cited by examiner

COMPREHENSIVE WORKSITE AND TRANSPORTATION SAFETY SYSTEM

FIELD OF INVENTION

The present invention relates to the field of safety equipment, and more particularly, to systems and methods for monitoring the safety of work environments and mobile work vehicles.

BACKGROUND

Safety is a major concern for industries such as public utilities, construction, and manufacturing. Companies with substandard safety records may lose contract bids and in some cases lose customers. Improving safety correlates with increased worker morale and overall productivity.

U.S. Patent Application Pre-grant Publication No. 2014/0202723 discloses an apparatus for dispensing a non-conductive mixture for extinguishing and suppressing electrical fires in an aerial lift. U.S. Patent Application Pre-grant Publication No. 2013/0209109 discloses an intercom system facilitating bucket-to-cab communications using a fiber-optic cable. U.S. Patent Application Pre-grant Publication No. 2013/0153333 discloses an aerial lift with a safety device for remotely sensing the presence of hazardous objects near the aerial lift of which an operator may not be aware.

BRIEF DESCRIPTION OF THE DRAWINGS

Various embodiments in accordance with the present disclosure will be described with reference to the drawings, in which.

DETAILED DESCRIPTION

Figure 1:
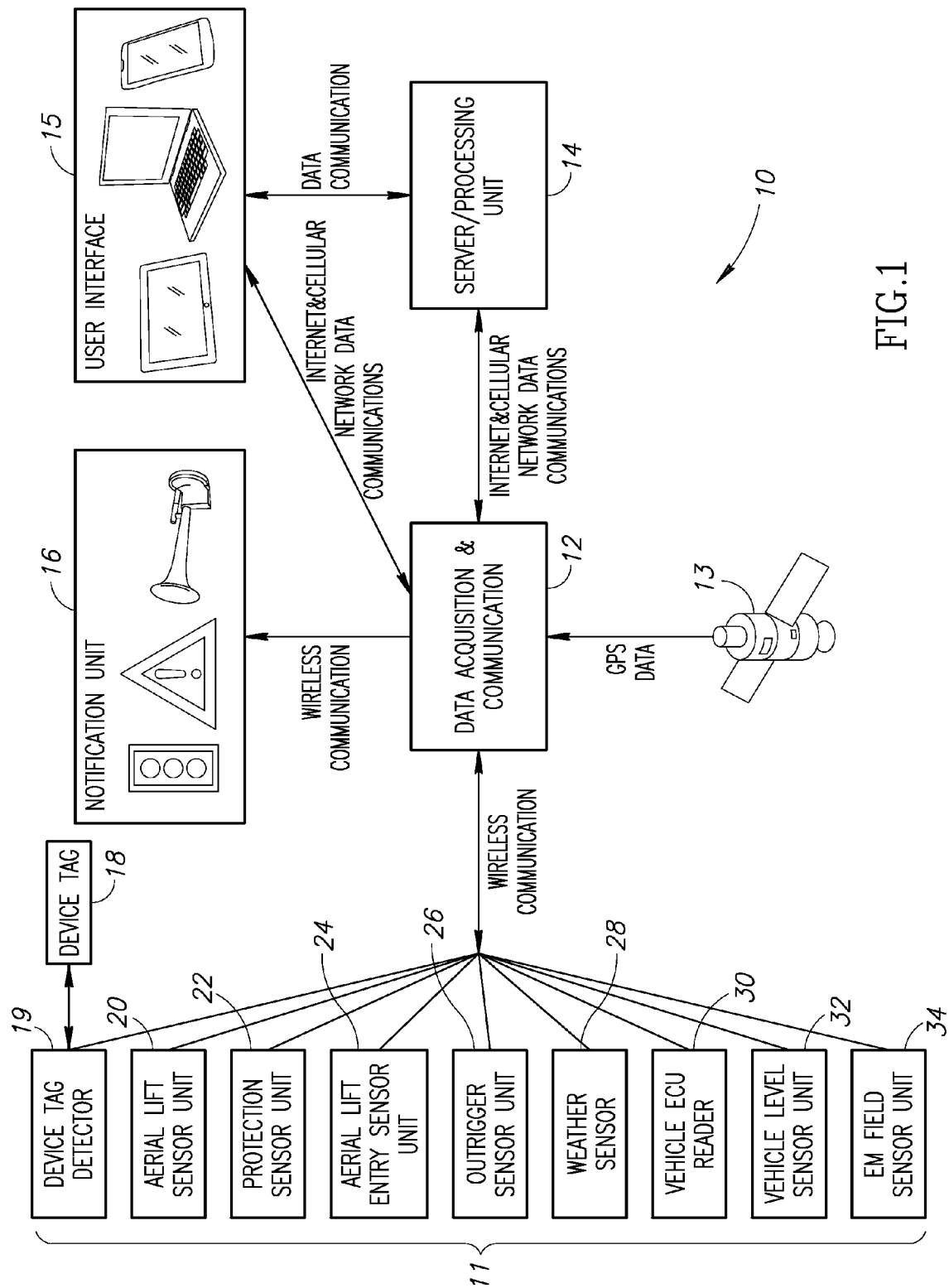
FIG. 1 illustrates a block diagram of a comprehensive worksite and transportation monitoring system according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to comprehensive systems and methods for monitoring the safety of a mobile work vehicle or worksite. The comprehensive system may actively manage the safety of work environments for personnel in high risk occupations such as construction, electrical utilities, railroads, manufacture, and the like. In particular, the system can detect unsafe conditions associated with work vehicles (e.g., bucket trucks, boom trucks), aerial lifts, electrical power lines, and vehicle transportation. Upon detecting unsafe conditions associated with the work vehicle, the system alerts workers through a local interface such as an audible horn, visual beacons, and a user interface. To achieve this, the system employs small battery powered sensors that wirelessly communicate with small computing devices which in turn are connected to processors and/or servers, which may be cloud-based. This network of devices further pulls data from third party services, such as weather services (e.g., NOAA, Accuweather) and mapping services (e.g., Google Maps), by using their Application Programming Interfaces (APIs). Sensor data and third party data may then be automatically processed and analyzed to provide real-time safety monitoring and alerts to users in management roles as well as workers in the field. The data may be further used to generate statistics and provide gamification aspects (i.e., competition as a motivator).

The system may track critical safety-related tools, such as first aid kits and defibrillators, to ensure safety equipment presence at appropriate worksites. Safety-related tools may also include tools that are preferred to safely perform certain worksite operations, such as a fiberglass "hot stick", which is used for conducting operations on electric power lines. At worksites requiring above ground work, audible and visible alarms or warnings may occur if a worker is not attached to the appropriate fall-protection or other safety equipment, or if an aerial lift is in an unsafe condition due to tilt, local temperature, local wind speed, or other aspects of the aerial lift described below. Real-time alerts in the form of local audible and visual alarms and SMS/email messages may be issued to appropriate individuals if a worksite is populated with workers not equipped with the required safety equipment. A mobile work vehicle driver's speed, braking, positive accelerations, and cornering may be tracked via single or multi-axis accelerometers, motion sensors and/or GPS in the vehicles to track and evaluate the driver's behavior.

The system may record and analyze the safety related data generated in the above situations. Analysis and processing of the safety-related data may be performed either locally on mobile computing devices or on remote servers. Sophisticated statistical methods may be employed including machine learning and the like in order to detect and track unsafe conditions and the root causes thereof. The results of the processing and analysis may be provided to customers as simple visualizations on a configurable real-time dashboard that employees and managers may use to easily assess the safety of different vehicles, crews, yards, and companies. If a user wants a deeper look at the safety-related data and analysis, this system is provided with a reporting tool that facilitates production of charts and spreadsheets based on searches over multiple metrics, time ranges, and company hierarchies. Both the dashboard and the reporting tool are accessible by any authorized internet-connected device so that workers, managers, and other appropriate personnel may assess the safety of drivers and work crews at a glance from any location provided with internet access.

The systems and methods described herein will greatly enhance standard safety techniques that companies currently use to promote a safe culture through real-time automated safety rankings of employees. The systems and methods also facilitate reviewing safety records and statistics of individual workers and work crews for performance reviews. A company's overall safety statistics may be tracked and easily produced to demonstrate a positive safety record when bidding for contracts.

FIG. 1 illustrates a block diagram of a comprehensive worksite and transportation monitoring system 10 according to an embodiment. The monitoring system 10 may include one or more target object sensor units 11, a data acquisition and communication unit (DACU) 12, a server/processing unit 14, a user interface 15, and a notification unit 16. The target object sensor unit 11 may be any of a device tag 18 and a device tag detector 19, an aerial lift sensor unit 20, a protection sensor unit 22, an aerial lift entry sensor unit 24, an outrigger sensor unit 26, a weather sensor 28, a vehicle electronic control unit ("ECU") reader 30, a vehicle level sensor unit 32, and an electromagnetic ("EM") field sensor unit 34. Each component of the monitoring system 10 is described in further detail below.

Figure 2:
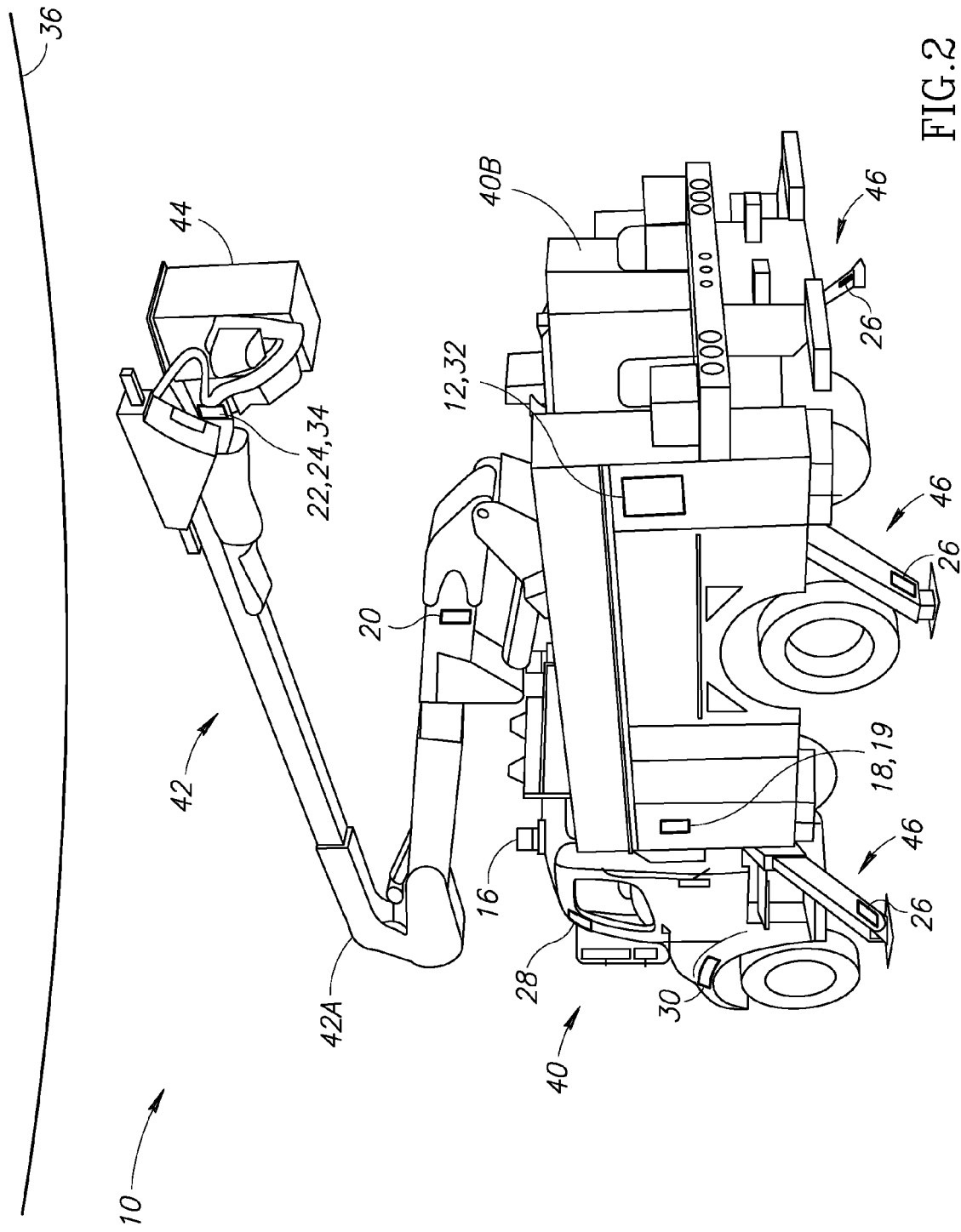
FIG. 2 illustrates a mobile work vehicle that is environment in which the comprehensive worksite and transportation monitoring system of FIG. 1 may operate.

The comprehensive monitoring system 10 is configured to monitor one or more safety determinative aspects of the mobile work vehicle or worksite, which are determinative of safety. An example of an application in the field of electric and cable utilities is shown in FIG. 2, which illustrates a mobile work vehicle 40 having an aerial lift 42 (see FIG. 2) that involves numerous safety determinative aspects. The aerial lift 42 has a lift arm 42A extending from a body 40B of the mobile work vehicle 40, the lift arm terminating at a lift platform 44. In some embodiments, the mobile work vehicle 40 has outriggers 46 that are configured to transition between a deployed position and a non-deployed position. In the deployed position, four outriggers 46 in FIG. 2 contact the ground to stabilize the mobile work vehicle 40 and/or the aerial lift 42. In the non-deployed position, the outriggers 46 are retracted away from the ground and closer to the mobile work vehicle body 40B than when in the deployed position. The mobile work vehicle 40 may have a conventional electronic control unit ("ECU"—not shown) that communicates with and controls electrical systems and the engine control unit of the vehicle 40. The ECU may receive and generate data indicating operating characteristics of the vehicle, including speed, acceleration, braking, and turning. Installed on the vehicle 40 is the notification unit 16, which may generate audio or visual notifications alerting workers of potentially unsafe or dangerous conditions.

Figure 3:
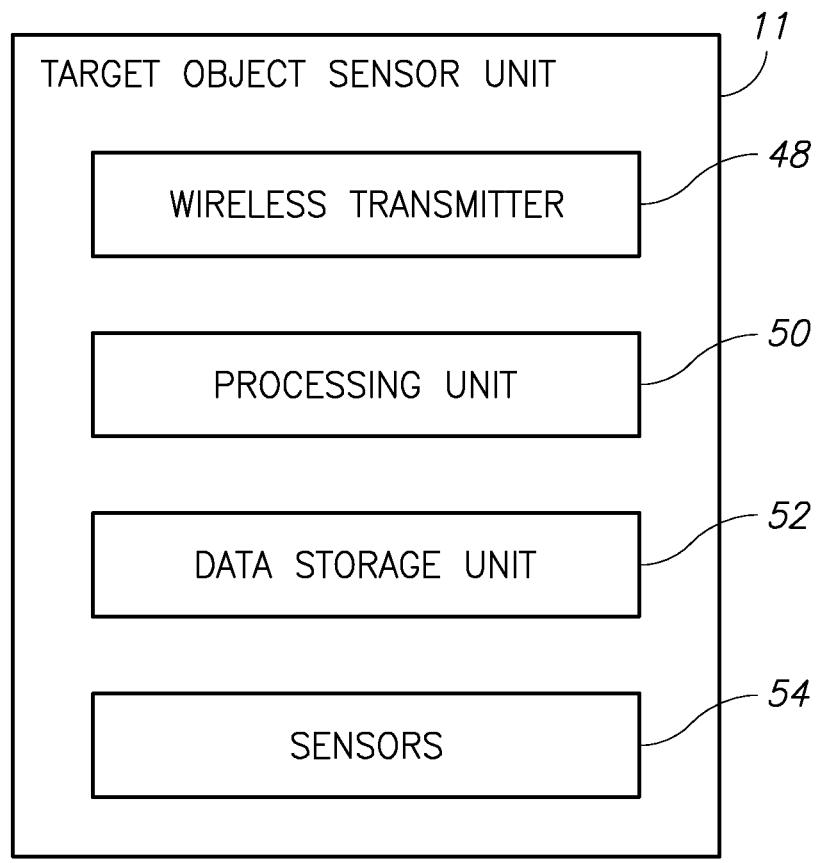
FIG. 3 illustrates a target object sensor unit of the comprehensive worksite and transportation monitoring system of FIG. 1.

The monitoring system 10 has one or more target object sensor units 11 that monitor safety determinative aspects of the mobile work vehicle 40 or worksite. Each target object sensor unit 11 may include a wireless transmitter 48, a processing unit 50, a data storage unit 52, and at least one sensor 54, as shown in FIG. 3. The sensor 54 may sense a condition regarding the worksite, the mobile work vehicle, or the local environment, and may include one or more of the following types of sensors: radio frequency identification tags, radio signal strength detector, accelerometer/motion sensors, gyroscopes, optical sensors (e.g., laser, active/passive infrared), sonic or ultrasonic sensors, image analysis detectors, magnetometers, a radiation source and radiation detector, an inductive system, electric field detectors, wind sensors (e.g., an anemometer), level sensors, pressure sensors (e.g., a barometer), temperature sensors, or other sensors. In general, the sensors 54 gather information relating to the status and configuration of the mobile work vehicle and worksite, as well as the operating environment around the target object sensor unit 11. A signal conditioner (not shown) may be associated with the sensors 54 to convert or condition a signal or data from the sensors 54 into a certain format. The processing unit 50 may receive and process data from the sensors 54 and/or execute a computer programs stored on the data storage unit 52, which may include one or more types of volatile (RAM) memory and non-volatile (ROM) memory. The wireless transmitter 48 and may include one or more short range wireless network transceivers, such as but not limited to Bluetooth®, LE Bluetooth® or ZigBee® transceivers. The target object sensor unit 11 is configured to transmit short range wireless signals that include information regarding sensor data and identification information identifying the target object sensor unit 11.

One safety determinative aspect of the mobile work vehicle 40 is whether the mobile work vehicle is equipped with a safety tool that may prevent injury during certain operations, such as "hot sticks", or medical supplies that may be used to help an injured worker, such as a first-aid kit or a defibrillator. The target object sensor unit 11 includes the device tag 18 attached to each important piece of safety tool or equipment, and the corresponding device tag detector 19 secured to a location on the mobile work vehicle 40 where the safety tool or equipment should be stored. The device tag 18 and the tag detector 19 are described in U.S. patent application Ser. No. 14/047,900, which is hereby incorporated by reference in its entirety. In one embodiment, the device tag 18 is a radio frequency identification module (RFID) designed to emit a radio signal with a specific digital signature that is associated with the corresponding safety tool or equipment in the database module 86. The device tag detector 19 is an RFID receiver configured to detect the radio signal emitted from the device tag 18 when the device tag is in close proximity with the device tag detector. When the device tag detector 19 detects the presence of the device tag 18, the processor unit 84 generates identification data indicating the specific digital signature and the wireless transceiver 84 transmits a signal including the identification data to the DACU 12. When the device tag detector 19 does not detect the presence of the device tag 18, the processor unit 84 generates data indicating the absence of the safety tool or equipment and the wireless transceiver transmits a signal including the data to the DACU 12.

A second safety determinative aspect is whether a person is occupying the aerial lift platform 44. The lift entry sensor unit 24 is disposed on the aerial lift platform 44 which detects when a human enters a previously empty lift and communicates this information to the DACU 12. In some embodiments, the lift entry sensor unit 24 may include an RFID detector that detects the presence of an active or passive RFID tag worn by a worker. The RFID tag may be located on a worker's helmet, safety vest, or tool belt, by way of non-limiting example. When the RFID detector detects a radio signal having a specific digital signature, the lift entry sensor unit 24 sends data to the DACU 12 indicating that a person is occupying the aerial lift platform. In some embodiments, the lift entry sensor unit 24 may include a received signal strength indication (RSSI) detector that detects the signal strength of a radio signal emitter worn by a worker. When the RSSI detector detects that the signal strength of a radio signal emitted exceeds a predetermined signal strength threshold, the lift entry sensor 24 sends data to the DACU 12 indicating that a person is occupying the aerial lift platform 44. In some embodiments, the lift entry sensor unit 24 may include a motion detector (e.g., active/passive infrared, infrared laser, microwave, ultrasonic motion detection) that detects motion on the aerial lift platform 44. When the motion detector detects motion on the aerial lift platform 44 or at the entrance of the aerial lift platform 44, the lift entry sensor 24 sends data to the DACU 12 indicating that a person is occupying the aerial lift platform 44. In some embodiments, the aerial lift sensor unit 20 may include an image analysis detector that uses visible and/or infrared technology to image the aerial lift platform 44. The aerial lift sensor unit 20 may analyze the images acquired to determine whether a human is occupying the aerial lift platform 44 and send data to the DACU 12 indicating that a person is occupying the aerial lift platform when the aerial lift sensor unit determines that a human is occupying the aerial lift platform.

Figure 4A:
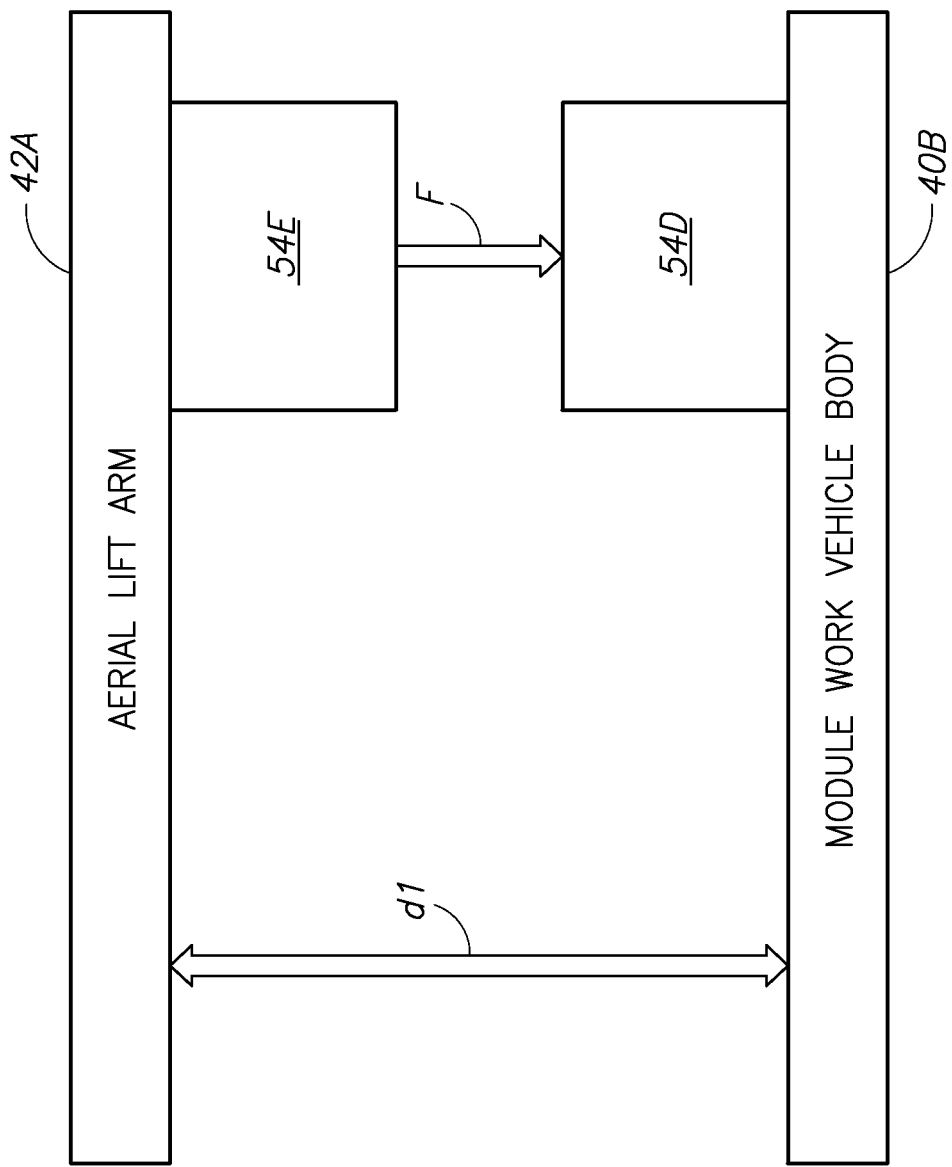
FIG. 4A illustrates components of the mobile work vehicle positioned in a first configuration.
Figure 4B:
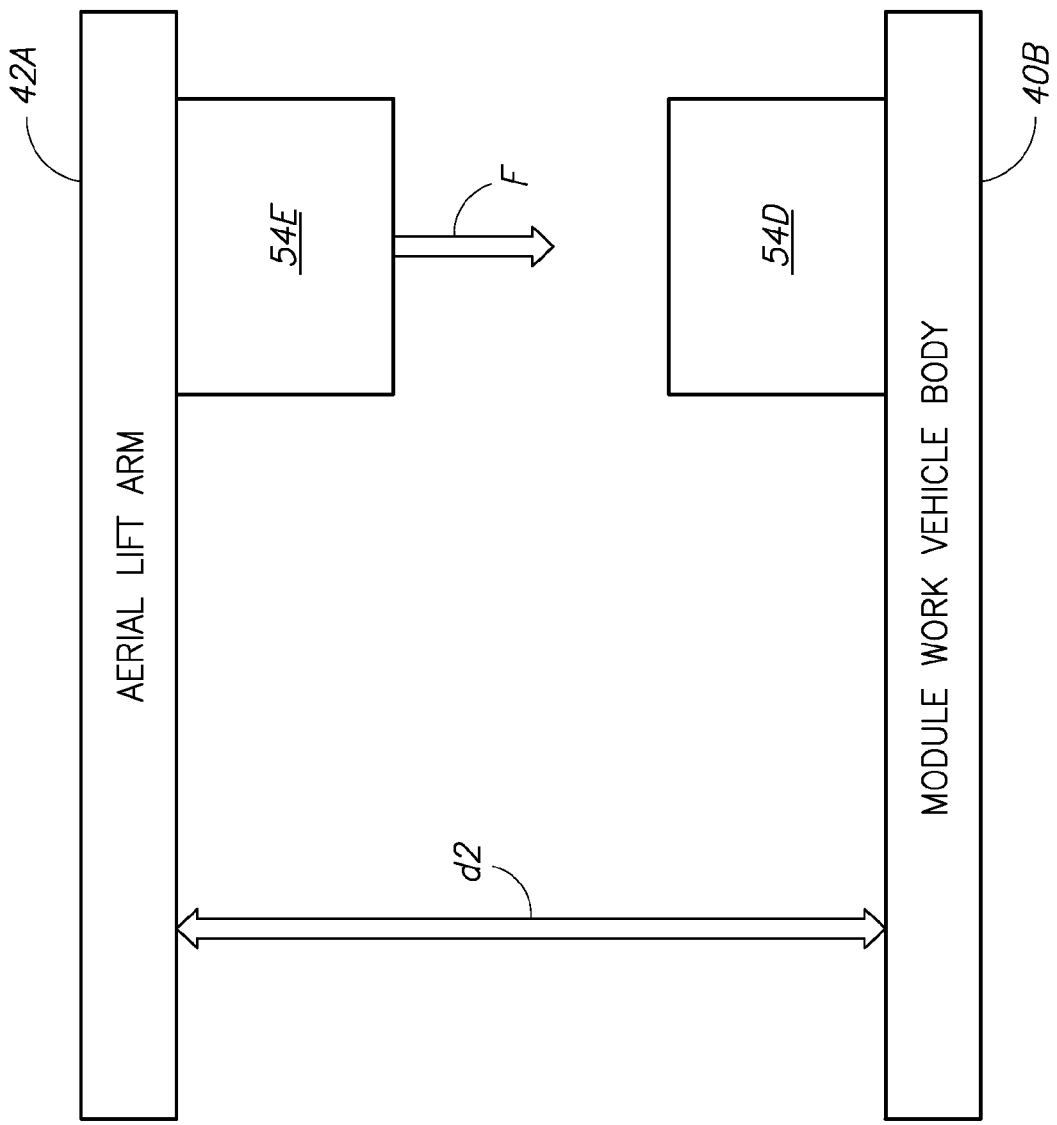
FIG. 4B illustrates components of the mobile work vehicle positioned in a second configuration.

A third safety determinative aspect is whether the aerial lift 42 is in an active position or in a home position. As illustrated in FIG. 4A, the aerial lift arm 42A is proximate to the mobile work vehicle body 40B in its home position. In the active position, the aerial lift arm 42A is in an elevated position spaced apart from the mobile work vehicle body 40B as illustrated in FIGS. 2 and 4B. The sensors 54 of the aerial lift sensor unit 20 include a detector portion 54D, and may further include an emitter portion 54E that emits a field F. When the aerial lift arm 42A is close to the mobile work vehicle body 40B, as illustrated in FIG. 4A, the detector portion 54D may detect a predetermined characteristic of the signal F (e.g., field strength, signal strength equal or exceed a predetermined threshold) indicating that the aerial lift arm is in the home position. Accordingly, the aerial lift sensor unit 20 may send information indicating that the aerial lift 42 is in the home position. Conversely, when the aerial lift arm 42A is in an active position away from the mobile work vehicle body 40B, as illustrated in FIG. 4B, the detector portion 54D does not detect the predetermined characteristic of the signal F (e.g., field strength, signal strength less than the predetermined threshold), the aerial lift sensor unit 20 may send information to the DACU 12 indicating that the aerial lift 42 is in the active position.

Other known sensors and configurations may also be used to satisfactorily implement the sensors 54. For example, the aerial lift sensor unit 20 may include a magnetic system wherein the detector portion 54D is a magnetometer that measures a magnetic field, and the emitter portion 54E is a magnetic component that emits a magnetic field above the Earth's magnetic field level. When the aerial lift arm 42A is a distance d1 close to the mobile work vehicle body 40B, the detected strength of the magnetic field emitted from the emitter portion 54E exceeds a predetermined threshold level that is greater than the strength of the Earth's magnetic field, indicating that the aerial lift arm is in the home position. As the aerial lift 42 moves away from its resting position, the emitter portion 54E moves away from the magnetometer and the measured magnetic field will decrease rapidly down to the background level. This decrease in magnetic field strength is detected by the monitoring system 10 and indicates that the aerial lift is in operation. When the aerial lift arm 42A is a distance d2 spaced apart from to the vehicle assembly main body 40B (see FIG. 4B), the detected strength of the magnetic field F is less than the predetermined threshold level, indicating that the aerial lift arm is in the active position. When the magnetic field detected by the detector portion 54D is less than the predetermined threshold level, the aerial lift sensor unit 20 may send information indicating that the aerial lift 42 is in the active position.

In another embodiment, the aerial lift sensor unit 20 may include a radiation system wherein the detector portion 54D is a radiation detection system and the emitter portion 54E is a radioactive source. The radioactive source would consist of a radioactive isotope that emits radiation in the form a gamma rays and/or neutrons. When the aerial lift 42 is in the home position, the radioactive source and radiation detector are close together (i.e., at a distance d1) such that the radiation detector measures a radiation level equal to or exceeding a predetermined radiation level above the background level. As the aerial lift 42 elevates the aerial lift platform 44 from the home position, the radioactive source moves away from the radiation detector and the radiation measured at the radiation detector decreases below the predetermined radiation level. When the radiation level measured at the radiation detector falls below the predetermined radiation level, the aerial lift sensor unit 20 sends information indicating that the aerial lift 42 is in the active position.

In yet another embodiment, the aerial lift sensor unit 20 may include a laser detector and a laser emitter tag. The detector portion 54D is the laser detector that detects laser photons emitted from the emitter portion 54E, which is the laser emitter tag. When the aerial lift 42 is in the home position, the emitter portion 54E and detector portion 54D are aligned so that the detector will detect the laser photons from the emitter. When the aerial lift 42 moves away from the home position, then the emitter-detector alignment is broken and the detector portion 54D no longer detects the laser photons. When the detector portion 54D fails to detect the laser photons emitted by the emitter portion 54E, the aerial lift sensor unit 20 sends information indicating that the aerial lift arm 42A is in the active position.

In another embodiment, the aerial lift sensor unit 20 may include an inductive system with an inductive coil as a detector portion 54D and a metallic object as an emitter portion 54E. The metallic object may already be a part of the aerial lift 42 or may be an additional component affixed to the aerial lift 42 as part of the inductive system. When the aerial lift 42 is in the home position, the inductive coil and metallic object are aligned and close enough such that the inductance of the coil is measurably affected. When the aerial lift 42 moves away from the home position, the coil and the metal object are no longer aligned and in close proximity such that the coil's inductance is no longer affected by the metal object. When a change in inductance is detected on detector portion 54D, the aerial lift sensor unit 20 sends information to the DACU 12 indicating that the aerial lift 42 is in the active position.

In another embodiment, the aerial lift sensor 20 may include an optical and/or near infrared sensor as the detector portion 54D without the need for the emitter portion 54E. The detector portion 54D may image the aerial lift arm 42A to produce images which are analyzed by the aerial lift sensor 20. When the aerial lift 42 is in a home position, the aerial lift sensor 20 analyzes imagery and recognizes the aerial lift arm 42A as being proximate to the mobile work vehicle body 40B. When the aerial lift 42 moves away from the home position, the aerial lift sensor 20 analyzes imagery and recognizes the aerial lift arm 42A as being in the active position. The aerial lift sensor 20 may then transmit information to the DACU 12 indicating that the aerial lift 42 is in the active position.

In another alternative embodiment, the aerial lift sensor unit 20 may include an ultrasonic emitter/detector system as a detector portion 54D and sound wave reflective object as an emitter portion 54E. The ultrasonic emitter/detector is configured to both emit sound waves and detect soundwaves of the same characteristic (e.g., frequency). The sound wave reflective object reflects sound from the ultrasonic emitter/detector and may be part of the lift or an additional component affixed to the lift as part of the ultrasonic sensor system. When the aerial lift 42 is in the home position, the sound waves emitted from the detector portion 54D are reflected from the emitter portion 54E and back toward the detector portion 54D. As the aerial lift moves away from the mobile work vehicle body 40B, the sound waves emitted from the detector portion 54D are no longer reflected from the emitter portion 54E back to the detector portion. When the detector portion 54D fails to detect the reflected ultrasonic waves, the aerial lift sensor unit 20 sends information to the DACU 12 indicating that the aerial lift 42 is in the active position.

In yet another embodiment, the aerial lift sensor unit 20 may include an RFID detector that detects the proximity of an RFID tag in a manner similar to that described with respect to the lift entry sensor unit 24. In some embodiments, the aerial lift sensor unit 20 may include an RSSI detector that detects the strength of a radio signal emitted from a radio signal emitter in a manner similar to that described with respect to the lift entry sensor unit 24.

Those skilled in the art will appreciate that other ones of the target object sensor units 11 of FIG. 1 may be implemented with one or more of the sensor arrangements described herein. For example, the protection sensor unit 22 can be implemented with the sensor arrangements described above.

Figure 5:
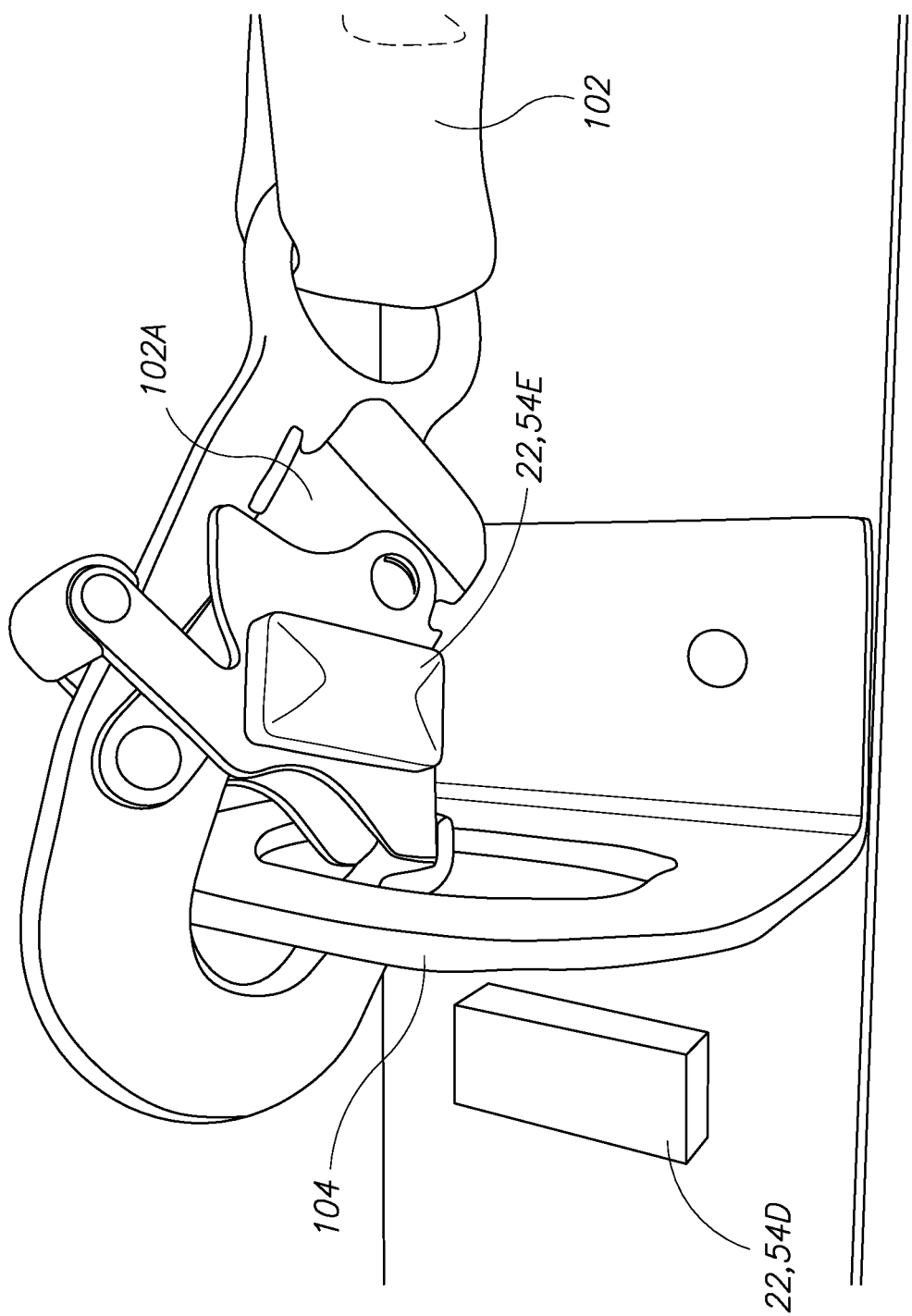
FIG. 5 illustrates a protection device engaged with a protection attachment component of an aerial lift of the mobile work vehicle.

A fourth safety determinative aspect of the mobile work vehicle 40 is whether a protection device 102 is engaged with a protection attachment component 104 on the aerial lift platform 44, as illustrated in FIG. 5. The protection device 102 may include a wearable fall-arrest device, such as a harness, that has a lanyard configured to attach to the protection attachment component 104, which is integrated with the aerial lift platform 44. The sensors 54 of the protection sensor unit 22 include the detector portion 54D and the emitter portion 54E. The detector portion 54D is located on or near the protection attachment component 104. The emitter portion 54E is located on or near an attachment portion 102A of the protection device 102. The protection sensor unit 22 is configured to detect the attachment state of the protection attachment component 104. The protection sensor unit 22 is configured to detect when the protection device 102 is attached to the protection attachment component 104 by detecting when the detector portion 54D is located near the emitter portion 54E. The detector portion 54D and emitter portion 54E of the protection sensor unit 22 operate in a manner similar to that discussed with respect to the detector portion 54D and emitter portion 54E of the aerial lift sensor unit 20.

A fifth safety determinative aspect of the mobile work vehicle 40 is whether a stability device is deployed, and more particularly, whether the outriggers 46 of the mobile work vehicle 40 are deployed. When operating the aerial lift 42, the outriggers 46 provide a wider, more stable base for operation of the aerial lift 42. Each outrigger 46 is provided with an outrigger sensor unit 26 that determines whether the outrigger 46 is in a deployed position where the outriggers 46 are extended to provide a wider base for the mobile work vehicle 40, or whether the outriggers 46 are in a non-deployed or retracted position where one or more of the outriggers 46 are not fully deployed and spaced apart from the mobile work vehicle body 40B. In some embodiments, the sensors 54 may include a magnetometer, a radiation system, an RFID system, an RSSI system, a motion detector, an inductive system, an optical and/or near infrared sensor, or an ultrasonic sensor implemented in a manner similar to that described with respect to other safety determinative aspects. In some embodiments, the sensors 54 of the outrigger sensor unit 26 are installed on a foot of the retractable outrigger 46 and include a distance-to-ground sensor (e.g., laser, ultrasonic), which senses the range between the outrigger foot and the ground. When the distance-to-ground sensor detects that the distance to the ground is less than a predetermined threshold distance, the outrigger sensor unit 26 sends information indicating that the outrigger 46 is in the deployed position.

A sixth safety determinative aspect is whether dangerous weather conditions are detected at the mobile work vehicle 40. The weather sensor 28 has one or more sensors 54 for detecting different weather conditions at the mobile work vehicle 40, such as wind speed, wind direction, temperature, and barometric pressure, by way of non-limiting examples. There may be one or more weather sensors 28 located on the mobile work vehicle and/or aerial lift 42. The weather sensor 28 transmits weather data to the DACU 12, which processes the weather data to determine whether measured weather conditions are unsafe for certain operations. For instance, if the weather sensor 28 measures high winds or extreme temperature conditions exceeding a predetermined threshold, the DACU 12 may issue notifications or alerts indicating that it is unsafe to operate the aerial lift 42.

The DACU 12 may also issue warnings or notifications based on predicted weather patterns. The weather module 78 (see FIG. 6) may receive weather forecasts regarding the local weather at and around the worksite or mobile work vehicle 40. If the forecast indicates a probability that unfavorable weather is approaching, the DACU 12 may issue a notification indicating that it is unsafe to conduct certain operations. For example, if a weather forecast indicates that a severe thunderstorm is approaching, the DACU 12 may issue a notification that it is unsafe to operate the aerial lift 42 or conduct operations that may take an extended period of time to complete.

A seventh safety determinative aspect is whether the mobile work vehicle 40 is level. The vehicle level sensor unit 32 may include a single-axis or multi-axis level sensor, such as a water level, that detects an orientation of the mobile work vehicle 40 with respect to a horizontal axis (i.e., normal to the earth's gravitational field). In FIG. 2, the vehicle level sensor unit 32 is shown as being located in the DACU 12; however, the vehicle level sensor unit 32 may be placed elsewhere on the mobile work vehicle 40 to measure the orientation of the mobile work vehicle and wirelessly communicate measurement data with the DACU 12. After detecting the orientation of the mobile work vehicle 40, the vehicle level sensor 32 sends data to the DACU 12 indicating the orientation of the mobile work vehicle. If the DACU 12 determines that the orientation of the vehicle exceeds a predetermined range (e.g., ±5°), the DACU 12 may send an alert or notification indicating that the mobile work vehicle 40 should be moved to a more level area, or that it is unsafe to conduct certain operations, such as operating the aerial lift 42.

An eighth safety determinative aspect is whether there is a risk of electric shock to a worker or the mobile work vehicle 40. Electrocution is a serious hazard encountered by linemen working on or near electric power lines. The aerial lift platform 44 may be used to lift a worker to power lines 36, as illustrated in FIG. 2. The EM field sensor unit 34 may detect the proximity of electric shock risk from alternating current (AC), direct current (DC), and/or static charge build-up. Risk of shock by AC may be detected by magnetometers or electric field detectors capable of detecting a time-varying field surrounding an AC power source or transmission line. Risk of electric shock from DC may be detected by magnetometers capable of detecting the non-time varying magnetic fields surrounding a DC power source or transmission line. Risk of shock from static charge build-up may be detected by electric field detectors that measure the non-time varying electric field surrounding static charges. The EM field sensor unit 34 measures the EM fields and sends information regarding the measured EM fields to the DACU 12. If the DACU 12 determines that measured EM fields indicate a risk of electric shock, the DACU 12 may issue an alert or notification indicating that an elevated risk of electric shock exists.

A ninth safety determinative aspect is whether a driver or vehicle is behaving erratically. An ECU controls many aspects of a vehicle's operation, including engine control, transmission control, brake control, and powertrain control, by way of non-limiting example. The vehicle ECU reader 30 reads information regarding operation of the mobile work vehicle 40 from the ECU and generates vehicle operation information regarding the driver's control of the vehicle and vehicle operation itself. The vehicle operation information may include number of hard brakes, hard accelerations, vehicle speed, and hard turns. The vehicle ECU reader 30 sends the vehicle operation information to the DACU 12, which processes the information to determine whether the driver or vehicle is operating safely. For example, if the number of times the driver accelerates very quickly or brakes very quickly exceeds a predetermined threshold within a certain period of time, the DACU 12 may issue an alert or notification. Additionally, the DACU 12 sends the vehicle operation information to the server/processing unit 14, which may issue alerts or notifications to other workers or managers by way of the user interface 15 that the driver may be in an unsafe frame of mind. The DACU 12 may also diagnose that the mobile work vehicle 40 is unsafe to operate. For example, if the ECU generates information indicating that a problem exists with the braking system, the DACU 12 may issue an alert or notification to the workers that immediate service to the mobile work vehicle 40 is required.

In the embodiments described herein, the emitter portion 54E and detector portion 54D may be exchanged. In the magnetic system described above, for example, the emitter portion 54E may be placed on the vehicle body 40B and the detector portion 54D could be placed on the aerial lift arm 42A. When the aerial lift platform 44 is configured with a protection sensor unit 22, the detector portion 54D may instead be located on or near the attachment portion 102A and the emitter portion 54E may instead be located on or near the protection attachment component 104.

Figure 6:
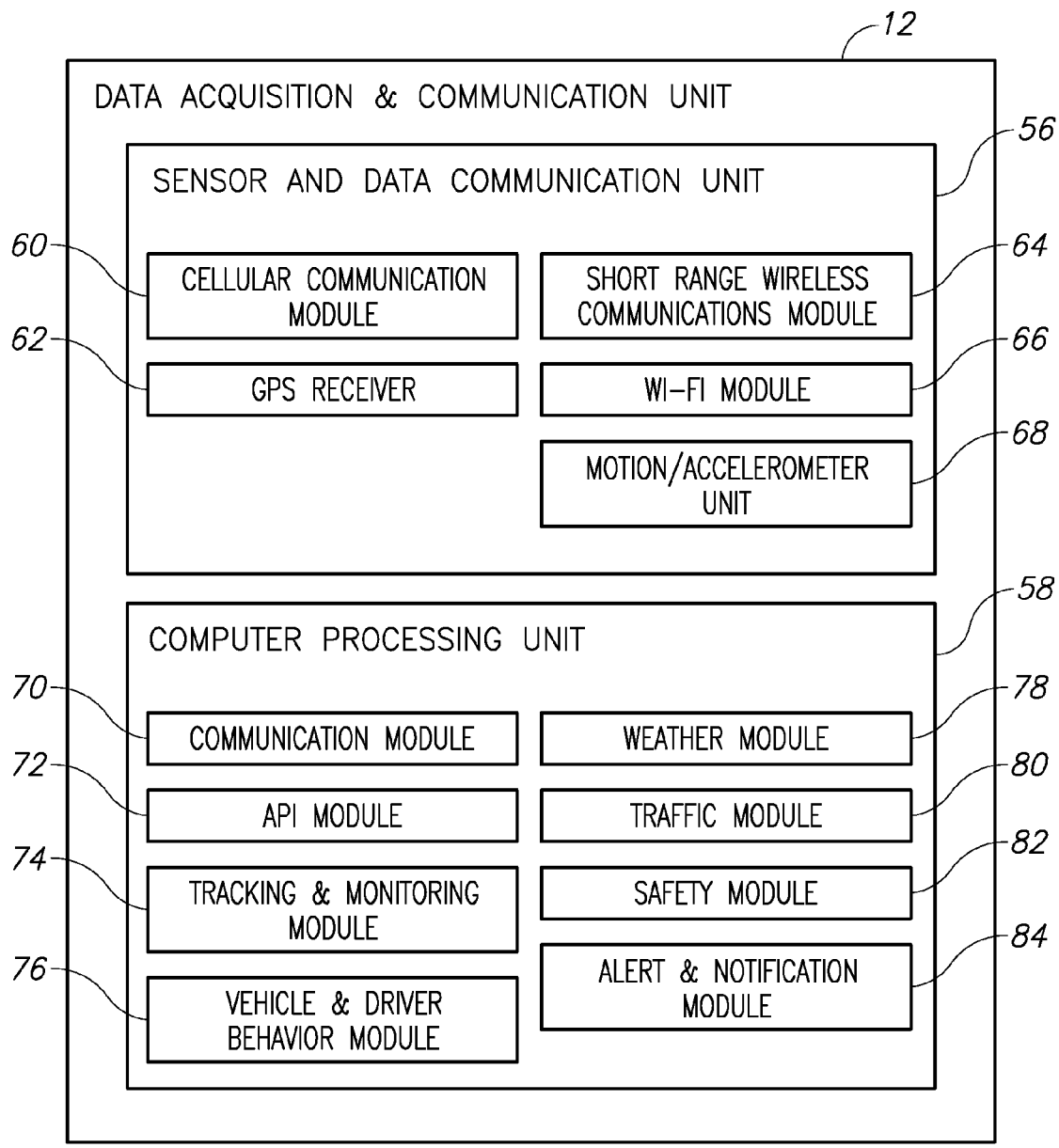
FIG. 6 illustrates a block diagram of a data acquisition and communications unit of the comprehensive worksite and transportation monitoring system of FIG. 1.

Referring to FIG. 6, the data acquisition and communication unit (DACU) 12 includes a sensor and data communication unit 56 and a computer processing unit 58. At least one DACU 12 is assigned to each mobile work vehicle or worksite. The sensor and data communication unit 56 includes a cellular communications module 60, a global positioning system (GPS) receiver 62, a short range communications module 64, a Wi-Fi Module 66, and a motion/accelerometer unit 68. The cellular communications module 60 may connect with a local cellular network and allow data and SMS communication over the cellular network. The cellular communications module 60 enables communication with the server/processing unit 14 when other connections, such as Wi-Fi, are not available. Although not illustrated, the sensor and data communication unit 56 may include a satellite communication module to enable communication with the server/processing unit 14 when the mobile work vehicle or worksite is out of range of a cellular network. The Wi-Fi module 66 has a Wi-Fi transceiver that enables the DACU 12 to communicate with the server/processing unit 14 and other devices and sensors over the internet when the DACU 12 is within range of a Wi-Fi network. The DACU 12 may communicate with the user interface 15 over the internet using the Wi-Fi module 66, or over a cellular network using the cellular communications module 60 (see FIG. 1). The DACU 12 may obtain location information regarding a location of the DACU by receiving signals from a GPS satellite 13 via GPS receiver 62. The short range communications module 64 has one or more short range communications transceiver, such as a Bluetooth® transceiver, an LE Bluetooth® transceiver, and/or a ZigBee® transceiver, through which the DACU 12 may wirelessly communicate with the target object sensor unit 11 and the notification unit 16. The motion/accelerometer unit 68 is attached to the vehicle 40 or is part of the DACU 12, and has one or more sensor that detects acceleration, orientation, speed, velocity, vibration, or other characteristics regarding the vehicle 40.

The computer processing unit 58 has conventional computer elements (e.g., a processing unit, memory, input/output interface) and includes a communication module 70, an API module 72, a tracking and monitoring module 74, a vehicle and driver behavior module 76, a weather module 78, a traffic module 80, a safety module 82, and an alert and notification module 84. The communication module 70 transmits data to and receives data from the sensor and data communication unit 56, including all incoming and outgoing messages from the target object sensor unit 11, the notification unit 16 and the server/processing unit 14. The communication module 70 is configured to communicate with each of the cellular communications module 60, the global positioning system (GPS) receiver 62, the short range communications module 64, the Wi-Fi Module 66, and the motion/accelerometer unit 68 to send and receive data. The API module 72 may use third-party APIs to access data regarding maps, traffic, routing, and current and forecasted weather. The tracking and monitoring module 74 receives data from the sensor and data communication unit 56 regarding detection of safety tools having the device tag 18 on the mobile work vehicle or the worksite. The tracking and monitoring module 74 tracks the tools detected on the mobile work vehicle or the worksite. The vehicle and driver behavior module 76 receives GPS data, ECU data regarding operation of the mobile work vehicle, and motion and acceleration data produced by motion/accelerometer unit 68 (see FIG. 1). Using the received data, the vehicle and driver behavior module 76 tracks travelling time and unusual vehicle behavior events such as hard brakes, hard positive accelerations, and hard corners. The vehicle and driver behavior module 76 may associate each unusual vehicle behavior event with a time stamp for analysis with local weather and traffic conditions. The weather module 78 receives weather data regarding conditions measured by weather sensor 28 as well as weather data from weather APIs to determine wind speed, temperature, and dangerous weather conditions which may affect the mobile work vehicle or worksite. The traffic module 80 receives traffic data from Map/Traffic APIs to determine traffic in the local area, as defined by received GPS data.

The safety module 82 analyzes sensor data from the sensor and data communication unit 56, the API module 72, the tracking and monitoring module 74, the vehicle and driver behavior module 76, the weather module 78, and the traffic module 80 in a process to determine safety status data and detect unsafe conditions. The safety status data may contain indications of violations, warnings, or impending conditions that may substantially increase risk at the worksite or mobile work vehicle. The safety module 82 outputs the safety status data to the alert and notification module 84 which processes the safety status data and sends notification commands to the notification unit 16 in FIG. 1. In response, the notification unit 16 may generate local audible and visual warning indicators to alert workers of a safety risk. The visual warning indicators may be a light on the exterior of the mobile work vehicle body 40B (see FIG. 2) or visual indicators located on an interior of the mobile work vehicle 40 or the lift platform 44. The alert and notification module 84 may provide alert and notification data to the communication module 70 for transmitting to the server/processing unit 14 via the sensor and data communication unit 56 (see FIG. 1). The server/processing unit 14 may store the alert and notification data and send notifications via the user interface 15 to high level employees and managers providing data regarding safety issues in the field. Communications with the server/processing unit 14 are tagged with identification information unique to each DACU 12 so that the server/processing unit 14 may appropriately track safety status data related to different worksites and/or mobile work vehicles. Where available, safety status data may also include employee identification information to associate and analyze individual employee behavior. Employees in the field that see or hear any visual/audible alerts can also access the user interface 15 from a mobile internet-connected device to identify the cause of the alerts. The user interface 15 may be implemented via a dashboard mounted device in an interior of the mobile work vehicle 40.

Figure 7:
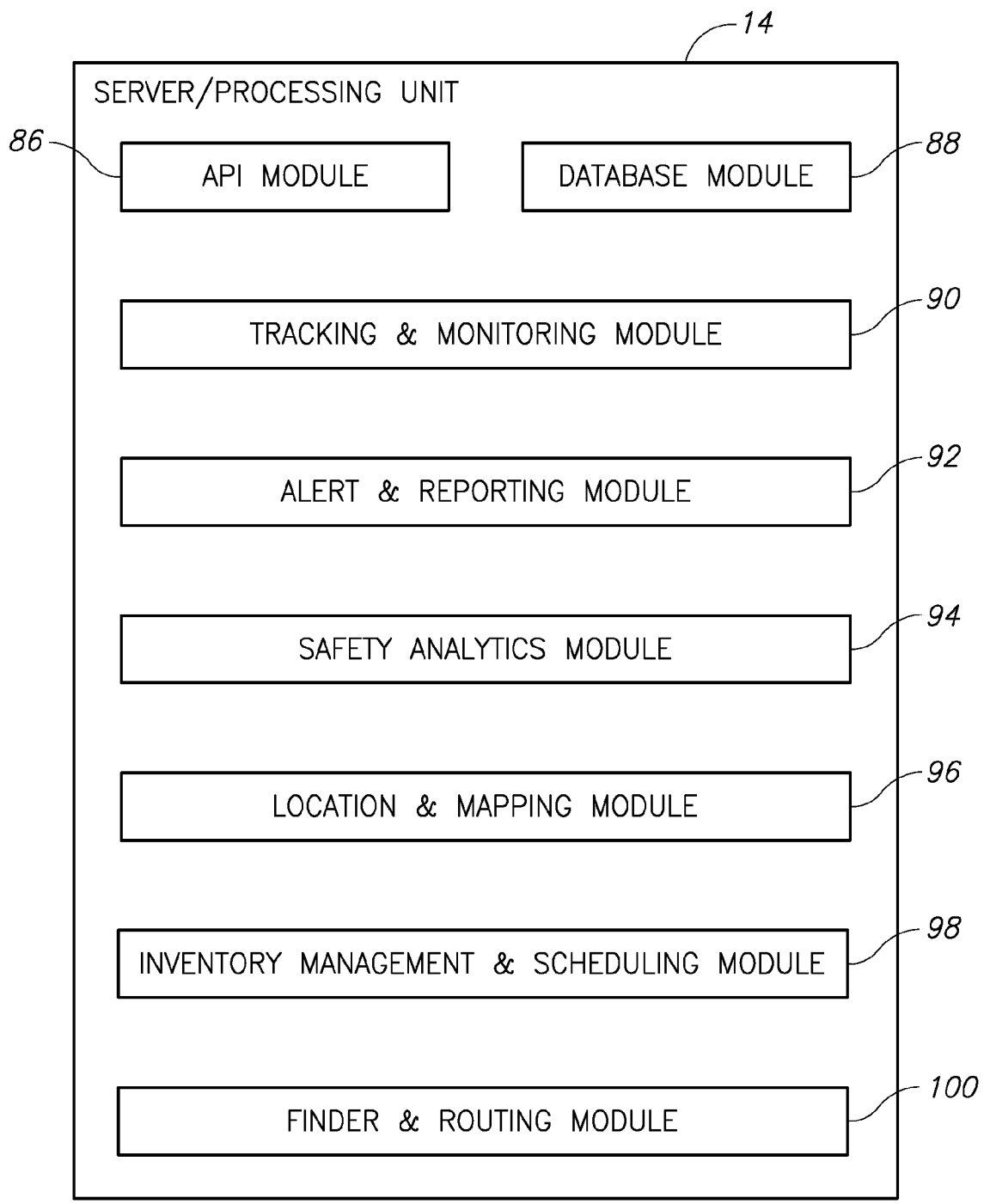
FIG. 7 illustrates a block diagram of a server or processing unit of the comprehensive worksite and transportation monitoring system of FIG. 1.

The server/processing unit 14 may have conventional computer elements (e.g., a processing unit, memory, input/output interface) and includes an API module 86, a database module 88, a tracking and monitoring module 90, an alert and reporting module 92, a safety analytics module 94, a location and mapping module 96, and inventory management and scheduling module 98, and a finder and routing module 100, as shown in FIG. 7. The server/processing unit 14 is configured to communicate with multiple DACUs 12, each worksite or mobile work vehicle being equipped with at least one DACU 12. The server/processing unit 14 processes data from the worksites and/or mobile work vehicles to monitor the safety of the workforce, and to manage safety equipment inventory and distribution. The API module 86 obtains information pertaining to maps, traffic, current weather, and forecasted weather using third-party APIs, such as Google Maps and Accuweather, by way of non-limiting example. Using a Relational or NoSQL approach to data storage and retrieval, the database module 88 stores safety status data from each DACU 12 in association with the identification information. The database module 88 also stores data entered via user input and data from third-party APIs. Data in the database module 88 is accessible by other modules in the server/processing unit 14, as well as DACUs 12.

The tracking and monitoring module 90 tracks the presence and location of tools and equipment at worksites and on mobile work vehicles. Specifically, the tracking and monitoring module 90 receives data regarding the presence and location of tools with device tags 18 detected by device tag detectors 19 from one or more DACU 12. Operation of the tracking and monitoring module 90 is described in further detail in U.S. patent application Ser. No. 14/047,900. The tracking and monitoring module 90 may aggregate worksite safety tool inventory and monitoring to higher levels, such as crew, yard, and operating company levels.

The alert and reporting module 92 is configured to send alerts to the user interface 15 based on alerts and safety status data generated from the DACU 12. Emails, phone calls and text messages (e.g., SMS, MMS) may also be sent to workers and managers to increase awareness of unsafe conditions. Information regarding alerts and other messages may be recorded in the database module 88 for later retrieval. Safety report generating software may automatically access the alert information to create periodically generated safety reports which may be viewed on the user interface 15 or sent to a user in other ways, such as email.

Figure 8:
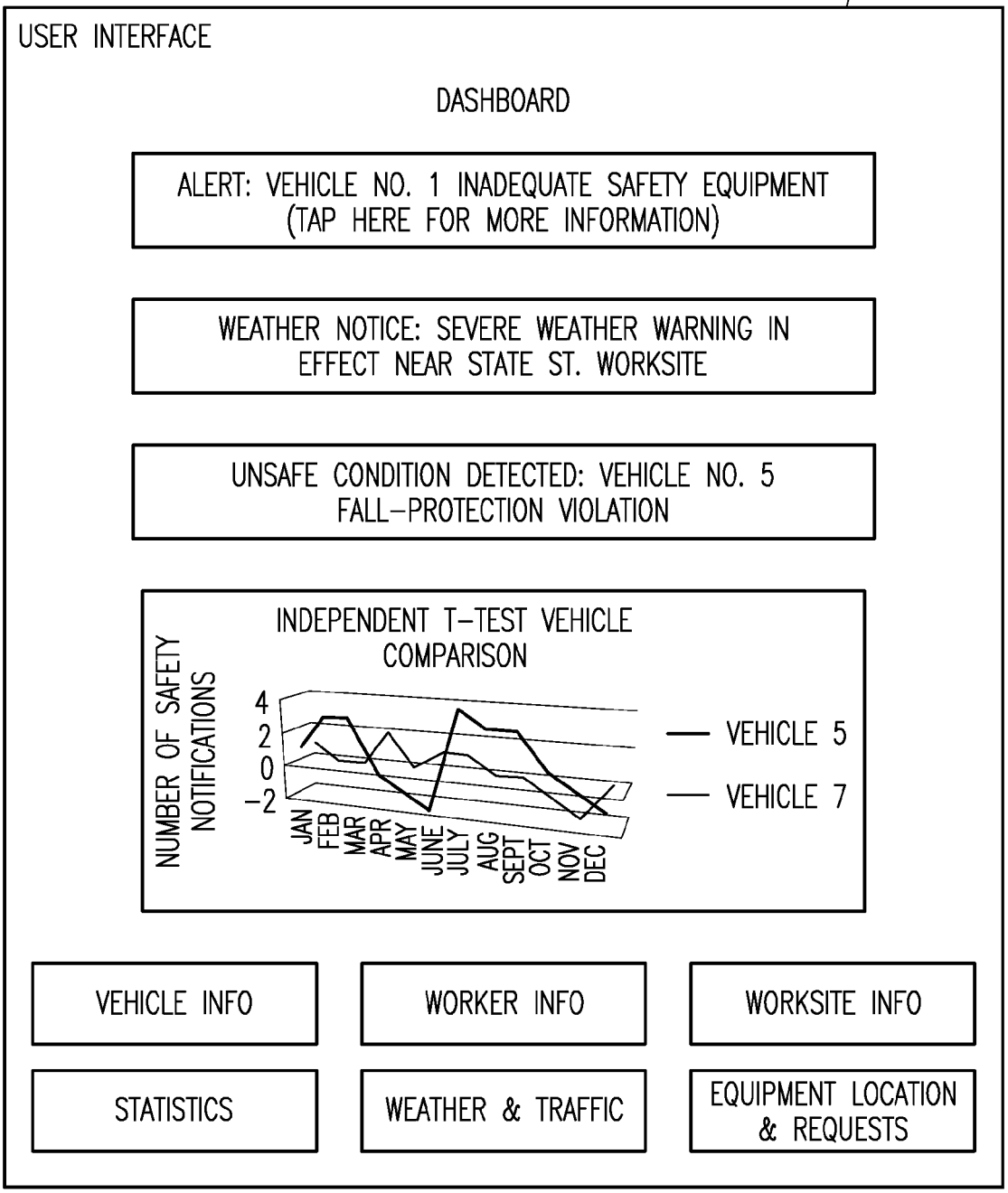
FIG. 8 illustrates a user interface of the comprehensive worksite and transportation monitoring system of FIG. 1.

The safety analytics module 94 generates safety statistics and visualizations to aid in understanding and aggregating safety status data from DACUs 12. In particular, the safety analytics module 74 acquires safety status data and identification information from the database module 88, analyzes the safety status data using statistical software, and generates the safety statistics and visualizations according to the output of the statistical software. The safety statistics and visualizations are made available at the user interface 15 by accessing safety status data in the database module 88. The safety statistics and visualizations may be accessed on the user interface 15 in at least two ways: (1) via a dashboard; or (2) a custom ad-hoc reporting and querying tool. The dashboard displays an at-a-glance analysis of simple statistics and charts that indicate safety behavior of individuals, vehicles, and higher company hierarchies (e.g., crews, yards, and operating companies). For example, FIG. 8 shows a user interface 15 with notifications regarding safety conditions at or near worksites and vehicles, as well as a statistical graph comparing two work vehicles 40. Buttons, such as "Vehicle Info" and "Equipment Locations & Requests" may be provided to access present and past safety status data. The dashboard may automatically rank different entities based on different metrics to facilitate simple safety evaluation, as well as to provide a gamification aspect in which entities may compete against each other. The custom ad-hoc reporting and querying tool allows a user wide latitude in querying the database module 88 over user-specified time-ranges, different company hierarchies, and for specific metrics. A user may access the reporting and querying tool to quickly generate reports and download data in the form of charts, tabular data, and spreadsheets. Using the querying and reporting tool, accident investigations and safety audits may be more easily and efficiently conducted than with conventional techniques.

The location and mapping module 96 uses GPS, mapping, and traffic data via third-party API data from the API module 86 to provide accurate real-time maps to the user interface 15 that display the locations of tools and equipment, mobile work vehicles, worksites, and other relevant levels of a user's hierarchy and special locations. The inventory management and scheduling module 98 retrieves data from the database module 88, the tracking and monitoring module 90, and the alert and reporting module 92 to ensure each worksite, office, mobile work vehicle, and other places of interest are equipped with a proper inventory of safety tools and equipment. The inventory management and scheduling module 98 may also track the lifecycle of each safety tool, including when each safety tool was bought, calibrated, updated, recharged, or had its batteries replaced. The inventory management and scheduling module 98 may monitor each tool's history and location, and provide alerts or notifications to the alert and reporting module 92 indicating that a tool needs to be calibrated, fixed, replaced, or otherwise serviced according to tool history.

The finder and routing module 100 is configured to locate and route a user to the nearest location where an item of interest is detected. If a user needs a safety tool or equipment, crew type, or other asset is needed, the user may request that asset via the "Equipment Locations & Requests" button on the user interface 15. The finder and routing module 100 may communicate with the inventory management and scheduling module 98 and the location and mapping module 96 to find the closest item matching the requested criteria or item, and determine the most efficient route to the item using the location and mapping module. The location and mapping module 96 may interact with the finder and routing module 100 to locate safety tools and equipment, and to aid in determining the most efficient driving route to the safety tools and equipment sought.

The user interface 15 is not particularly limited and may be implemented on any device having a display, I/O interface, a communication component capable of network communications, and a processor. By way of non-limiting example, the user interface 15 may be a smartphone, laptop computer, desktop computer, server computer, or tablet computer. The user interface 15 may run a software application that is designed to display interactive notifications, alerts, statistics, and safety status data relating to worksite or vehicle 40 safety, as shown in FIG. 8. One or more user interfaces 15 may be located on the vehicle 40, the worksite, or remotely at a company office or on a smartphone.

In some embodiments, the DACU 12 may be connected to control systems of the mobile work vehicle 40. When the DACU 12 determines that one or more safety determinative aspects of the mobile work vehicle 40 indicate an unsafe condition, the DACU 12 may interact with the control systems of the mobile work vehicle to prohibit or inhibit operation of certain systems. For example, if the vehicle level sensor unit 32 detects that the level of the mobile work vehicle 40 is outside of an acceptable range, the DACU 12 may prohibit operation of the aerial lift 42 until the level of the mobile work vehicle 40 is within the acceptable range. Similarly, the DACU 12 may prohibit operation of the aerial lift 42 if the outrigger sensor units 26 indicate that the outriggers 46 are in the non-deployed position. In another example, the DACU 12 may inhibit the aerial lift 42 from being further elevated if the DACU determines that the EM field sensor unit 34 has measured an unsafe risk of electric shock.

Figure 9:
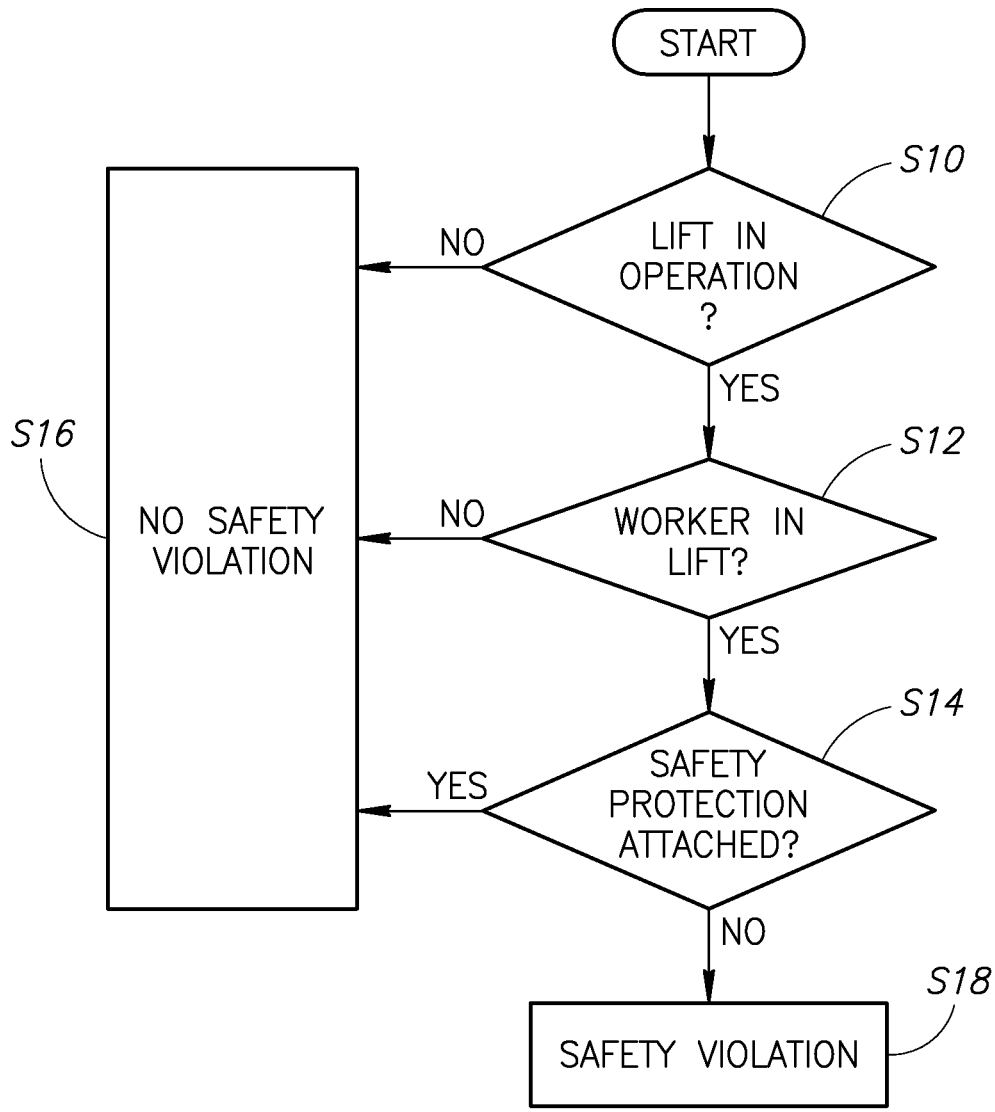
FIG. 9 illustrates a first portion of a flow diagram of a safety module of the comprehensive worksite and transportation monitoring system of FIG. 2.

The DACU 12 and/or the server/processing unit 14 may be equipped with software to execute methods for determining whether one or more safety determinative aspects indicate that an unsafe condition exists. In FIG. 9, the DACU 12 processes safety status data to assess whether a worker in the aerial lift 42 is properly secured (i.e., tied down) or whether a tie-down violation has occurred. That is, the DACU 12 determines whether the aerial lift 42 is in operation and whether a worker in the aerial lift 42 has attached the protection device 102 to the protection attachment component 104. In step S10, the DACU 12 analyzes the safety status data to determine whether the aerial lift 42 is in operation, and in particular, whether the aerial lift sensor unit 20 detects that the aerial lift 42 is in the home position or in the active position. If the aerial lift 42 is detected to be in the home position, the DACU 12 proceeds to step S16. In step S16, the DACU 12 determines that an unsafe condition does not exist regarding a tie-down violation and the tie-down violation assessment ends. If the aerial lift 42 is detected to be in the active position, the DACU 12 proceeds to step S12.

In step S12, the DACU 12 analyzes the safety status data to determine whether a worker is detected in the aerial lift 42. In particular, the DACU 12 determines whether the aerial lift entry sensor 24 indicates that a person is occupying the aerial lift 42. If the DACU 12 indicates that a person is not occupying the aerial lift 42, the DACU 12 proceeds to step S16 where the tie-down violation assessment ends. If the DACU 12 indicates that a person is occupying the aerial lift 42, the DACU 12 proceeds to step S14 to determine whether the protection device 102 is engaged with the protection attachment component 104.

In step S14, if the protection sensor unit 22 detects that the protection device 102 is engaged with the protection attachment component 104, then the DACU 12 proceeds to step S16 where the tie-down violation assessment ends. If the protection sensor unit 22 detects that the protection device 102 is not engaged with the protection attachment component 104, then the DACU 12 proceeds to step S18. In step S18, the DACU 12 determines that an unsafe condition exists and may issue an alert or notification to the notification unit 16. The DACU 12 may additionally send data to the server/processing unit 14 that the unsafe condition exists. The order of steps S10, S12, and S14 may be rearranged to achieve substantially the same results.

Figure 10:
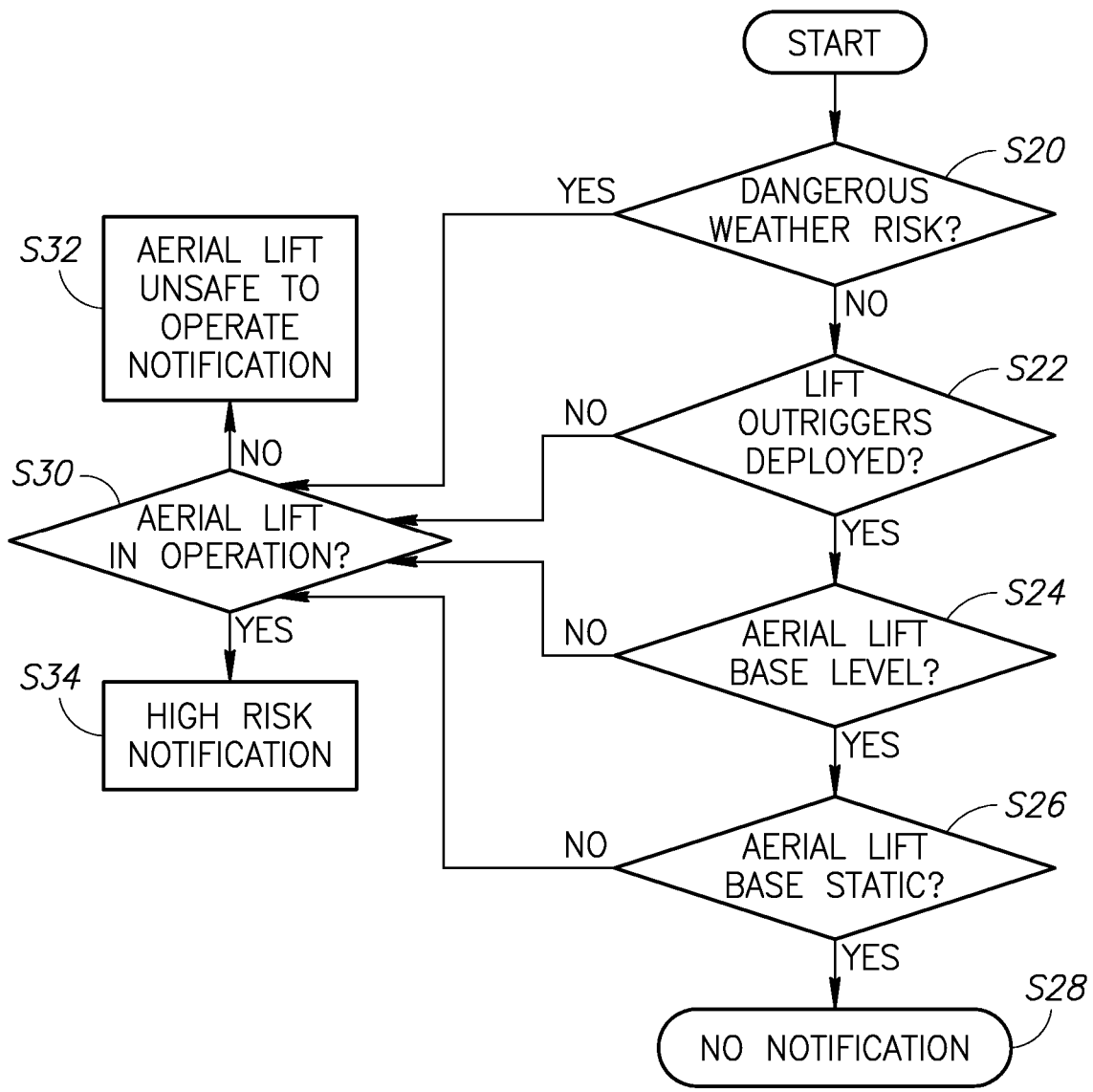
FIG. 10 illustrates a second portion of a flow diagram of a safety module of the comprehensive worksite and transportation monitoring system of FIG. 2.

In FIG. 10, the DACU 12 determines whether it is unsafe to operate the aerial lift 42. In step S20, the DACU 12 analyzes safety status data from the weather sensor 28 to determine whether wind speed or temperature, for example, exceed a predetermined threshold. The DACU 12 may also analyze weather data from the weather module 78 (see FIG. 6) to determine whether unfavorable weather, such as a severe thunderstorm, is approaching. If the DACU 12 determines that the safety status data and/or weather data do not indicate a dangerous weather risk, the DACU 12 proceeds to step S22. If the DACU 12 determines that the safety status data and/or weather data indicate a dangerous weather risk, the DACU 12 proceeds to step S30.

In step S22, the DACU 12 analyzes the safety status data to determine whether the outriggers 46 are in the deployed position. If the DACU 12 determines that the outrigger sensor units 26 indicate that the outriggers 46 are in the non-deployed or retracted position, the DACU 12 proceeds to step S30. If the DACU 12 determines that the outrigger sensor units 26 indicate that the outriggers 46 are in the deployed position, the DACU 12 proceeds to step S24.

In step S24, the DACU 12 analyzes the safety status data to determine whether the base of the aerial lift 42 is level; that is, whether the orientation of the mobile work vehicle 40 with respect to the horizontal axis (i.e., direction normal to the Earth's gravitational field) is within an acceptable range. If the DACU 12 determines that the vehicle level sensor unit 32 indicates that the mobile work vehicle is not within an acceptable range, the DACU 12 proceeds to step S30. If the DACU 12 determines that the vehicle level sensor unit 32 indicates that the mobile work vehicle is within an acceptable range, the DACU 12 proceeds to step S26.

In step S26, the DACU 12 analyzes the safety status data to determine whether the base of the aerial lift is static; that is, whether the mobile work vehicle 40 is in motion. If the DACU 12 determines that the motion/accelerometer 48 or vehicle ECU reader 30 indicates that the mobile work vehicle is in motion, the DACU 12 proceeds to step S30. If the DACU 12 determines that the motion/accelerometer 48 or vehicle ECU reader 30 indicate that the mobile work vehicle is static, the DACU 12 proceeds to step S28 where the aerial lift operation risk assessment ends.

In step S30, the DACU 12 determines whether the aerial lift 42 is in operation. If the DACU 12 determines that the aerial lift sensor 20 indicates that the aerial lift 42 is in the home position, the DACU issues an alert or notification that the aerial lift 42 would be unsafe to operate. If the DACU determines that the aerial lift sensor 20 indicates that the aerial lift 42 is in the active position, the DACU issues a high risk notification or alert that the aerial lift 42 is currently being operated in an unsafe condition.

Figure 11:
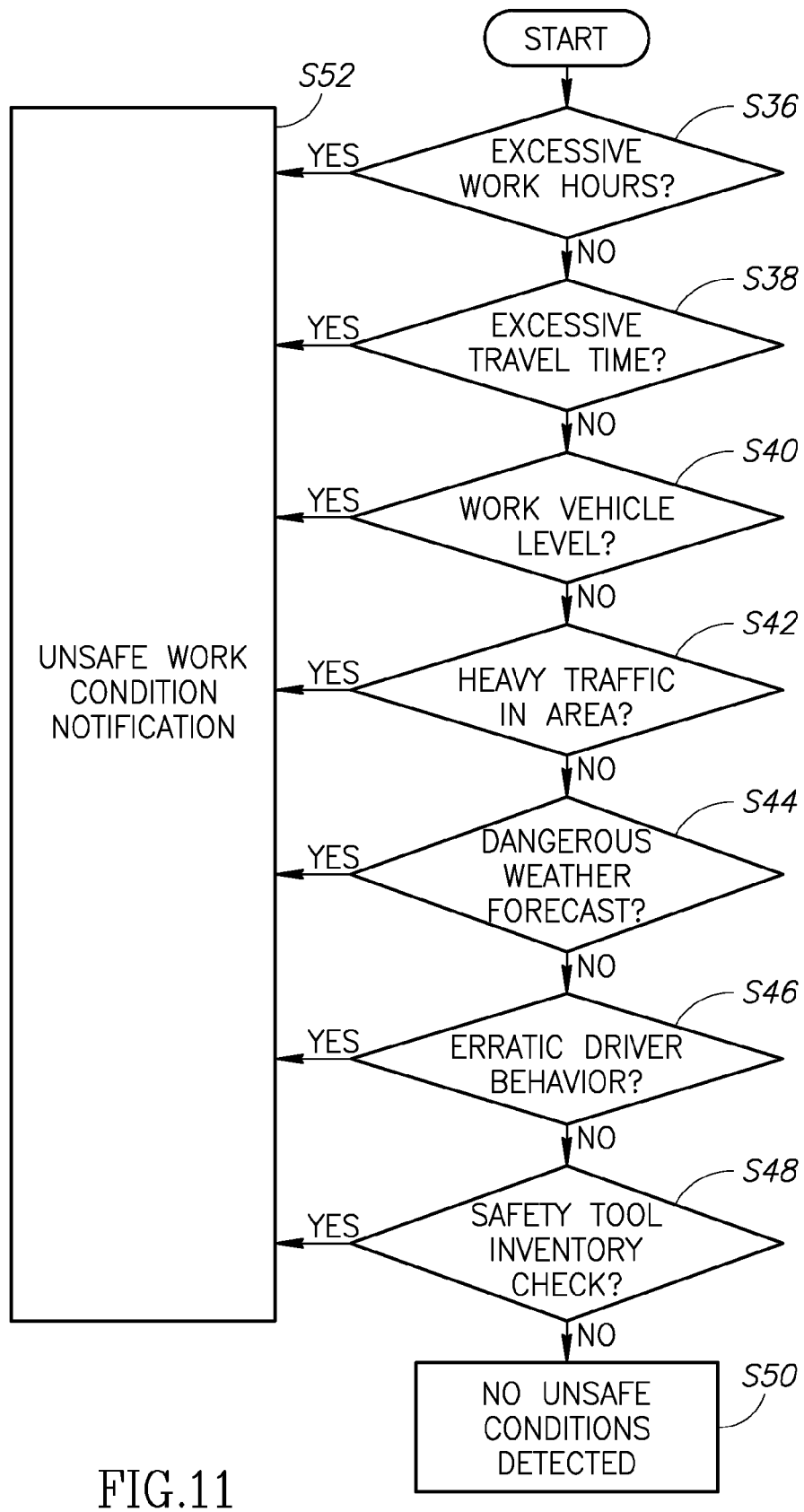
FIG. 11 illustrates a third portion of a flow diagram of a safety module of the comprehensive worksite and transportation monitoring system of FIG. 2.

In FIG. 11, the DACU 12 determines whether any unsafe conditions exist. In step S36, the DACU 12 analyzes location data from the GPS receiver 62 over time to determine whether workers have been working too many hours, and thus at risk of exhaustion or injury due to inattentiveness. If the location data indicate that the mobile work vehicle 40 has been at a work site or other location for a period of time exceeding a predetermined threshold time period, the DACU 12 proceeds to step S52. If the location data indicate that the mobile work vehicle 40 has been at a work site or other location for a period of time less than the predetermined threshold time period, the DACU 12 proceeds to step S38.

In step S38, the DACU 12 analyzes the vehicle operation information from the vehicle ECU reader 30 to determine whether the mobile work vehicle 40 has been traveling too long in a day. Drivers who operate a vehicle for prolonged periods of time are less alert and more prone to be involved in an accident. In step S38, if the vehicle operation information indicates that the mobile work vehicle 40 is operated for a period of time exceeding a predetermined time period, the DACU proceeds to step S52. If the vehicle operation information indicates that the mobile work vehicle 40 is not operated for a period of time exceeding a predetermined time period, the DACU proceeds to step S40.

In step S40, the DACU 12 analyzes the safety status data to determine whether the base of the aerial lift 42 is level. In particular, the DACU 12 determines whether the orientation of the mobile work vehicle 40 with respect to the Earth's gravitational field is within an acceptable range. If the DACU 12 determines that the vehicle level sensor unit 32 indicates that the mobile work vehicle is not within an acceptable range, the DACU 12 proceeds to step S52. If the DACU 12 determines that the vehicle level sensor unit 32 indicates that the mobile work vehicle is within an acceptable range, the DACU 12 proceeds to step S42.

In step S42, the DACU 12 analyzes traffic and map information from the traffic module 80 to determine whether there is heavy traffic in the area or whether the mobile work vehicle 40 is approaching heavy traffic. If the traffic and map information indicate that there is heavy traffic in the area or that the mobile work vehicle 40 is approaching heavy traffic, the DACU 12 proceeds to step S52. If the traffic and map information indicate that there is heavy traffic in the area and that the mobile work vehicle 40 is approaching heavy traffic, the DACU 12 proceeds to step S44.

In step S44, the DACU 12 analyzes weather information from the weather module 78 to determine whether unfavorable weather is forecast near the mobile work vehicle 40. If the DACU 12 determines that the weather information indicates that unfavorable weather is forecast near the mobile work vehicle 40, the DACU 12 proceeds to step S52. If the DACU 12 determines that the weather information indicates that no unfavorable weather is forecast near the mobile work vehicle 40, the DACU 12 proceeds to step S46.

In step S46, the DACU 12 analyzes data from the vehicle ECU reader 30 and/or the motion/accelerometer 48 to determine whether a driver of the mobile work vehicle is driving erratically or whether the vehicle ECU reader 30 indicates that a problem exists in a component of the mobile work vehicle 40. If the DACU 12 determines that the driver of the mobile work vehicle is driving erratically by examining the number of hard brakes, hard positive accelerations, hard turns, or excessive speeding, the DACU 12 proceeds to step S52. If the DACU 12 determines that the vehicle ECU reader 30 indicates that a problem exists in a component of the mobile work vehicle 40, such as a problem with the brakes, the DACU 12 proceeds to step S52. If the DACU 12 determines that the driver of the mobile work vehicle is not driving erratically and that the vehicle ECU reader 30 indicates that no problem exists in a component of the mobile work vehicle 40, the DACU proceeds to step S48.

In step S48, the DACU 12 determines whether the mobile work vehicle 40 is equipped with the required safety tools, such as a "hot stick" or defibrillator. If the DACU 12 determines that the device tag detectors 19 on the mobile work vehicle indicate that the required safety equipment is present on the mobile work vehicle 40, the DACU proceeds to step S50 where the unsafe condition assessment terminates. If the DACU 12 determines that one or more device tag detectors 19 on the mobile work vehicle indicate that the required safety equipment is absent from the mobile work vehicle 40, the DACU proceeds to step S52.

In step S52, the DACU 12 issues an alert or notification to the notification unit 16 indicating that an unsafe working condition exists. The alert or notification may be tailored to the particular violation. For example, if the DACU 12 determines that the base of the aerial lift 42 is not level, the DACU 12 may issue a notification to an indicator in the interior of the mobile work vehicle 40 to move to a flatter location. If the DACU 12 determines that the mobile work vehicle 40 is approaching heavy traffic, the DACU 12 may issue a notification to an indicator in the interior of the mobile work vehicle 40 to suggest an alternate route. If the DACU 12 determines that unfavorable weather is approaching, the DACU may issue an audible alert to workers outside the mobile work vehicle 40 notifying them of approaching weather, or a notification to an indicator on the interior of the mobile work vehicle 40 to check the forecast. If the DACU 12 determines that the driver is driving erratically, the DACU may issue a notification to an indicator on the interior of the mobile work vehicle 40 warning the driver. If the DACU 12 determines that the mobile work vehicle 40 is not equipped with the proper safety equipment, the DACU may issue a notification to an indicator on the interior of the mobile work vehicle 40 warning the occupants of which safety equipment is absent.

If the DACU 12 detects a safety violation, the DACU may send safety status data to the server/processing unit 14 including which particular safety violation has occurred. The server/processing unit 14 may send notifications to the user interface 15 notifying the recipient of the unsafe conditions and suggest an appropriate action. For example, the server/processing unit 14 may suggest a nearest location of a safety tool if the DACU 12 determines that safety equipment is absent. If the DACU 12 determines that a driver is driving erratically, the server/processing unit 14 may send a notification to a worksite foreman that the driver has exhibited unsafe behavior.

Those of ordinary skill in the art will appreciate that the foregoing example of an electric utilities truck is non-limiting, and that the system may be employed in other environments to monitor the safety of worksites and work vehicles. For example, the monitoring system 10 may be utilized in a railroad yard. Railroad cars may be equipped with sensors that detect the presence of persons between railcars when two railcars are being coupled. If a person is detected in the vicinity of the railcar connectors, the DACU 12 may issue an audible and visual alert to notify the worker to quickly vacate the area. In industrial manufacturing, the monitoring system 10 may be similarly employed to alert workers and/or to prevent operation when a person is detected in a dangerous area of a machine that is operating or about to begin operation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Accordingly, the invention is not limited except as by the appended claims.

What is claimed is:

1. A safety monitoring system for monitoring the safety of a mobile work vehicle, comprising:
    a target object sensor unit comprising a sensor device and a communications transmitter, the sensor device comprising a first component and a second component, at least one of the first component and the second component being configured to be selectively affixed to a location on or associated with the mobile work vehicle, wherein the first component is configured to determine a proximity of the second component to the first component without contact between the first component and the second component, the target object sensor unit being configured to monitor a safety determinative aspect of the mobile work vehicle, the target object sensor unit being further configured to (i) measure an operating condition of the safety determinative aspect using the sensor device, (ii) generate condition data regarding the operating condition, and (iii) transmit the condition data from the communications transmitter;
    a data acquisition/communication unit (DACU) comprising a first processor, a condition data storage device, and a first network interface device configured to couple the DACU to a communications network, the DACU being configured to attach to a second location on the mobile work vehicle, the DACU being further configured to generate and process safety status data indicating a safety condition of the safety determinative aspect based on the condition data received from the target object sensor unit, and further configured to transmit the safety status data using the first network interface; and
    a server computing device comprising a second processor, a second data storage device, and a second network interface device configured to couple the server computing device to the communications network, the server computing device being communicatively coupled to the DACU via the communications network and operative to receive the safety status data from the DACU.

2. The safety monitoring system of claim 1, further comprising:
    a notification device configured to generate a notification signal alerting a worker proximate to or in the mobile work vehicle,
    wherein the DACU is configured to generate a safety status notification responsive to processing safety status data indicating that the operating condition of the safety determinative aspect corresponds to an unsafe condition, and is configured to transmit the safety status notification to the notification device, and
    wherein the notification device is configured to generate the notification signal responsive to receiving the safety status notification.

3. The safety monitoring system of claim 2 wherein the DACU is configured to generate a safety status notification responsive to processing safety status data indicating that the operating condition corresponds to an unsafe condition regarding the safety determinative aspect, the DACU is configured to transmit the safety status notification to the server computing device.

4. The safety monitoring system of claim 1, further comprising a global positioning system receiver configured to provide location information regarding a location of the mobile work vehicle, wherein at least one of the DACU and/or the server computing device receives the location information.

5. The safety monitoring system of claim 4 wherein the first network interface is configured to receive weather data regarding local or approaching weather conditions according to the location information.

6. The safety monitoring system of claim 1 wherein the safety determinative aspect is detection of a tool on the mobile work vehicle, the target object sensor unit is configured to determine that the operating condition of the safety determinative aspect is (i) an equipped status when the tool is detected to be located on the mobile work vehicle, and (ii) an unequipped status when the tool is not detected to be located on the mobile work vehicle.

7. The safety monitoring system of claim 1 wherein the safety determinative aspect is regarding an aerial lift component of the mobile work vehicle, and the target object sensor unit being configured to determine that the operating condition of the safety determinative aspect is (i) a non-operational status when the aerial lift component is located at a home position, and (ii) an operational status when the aerial lift component is located at an active position.

8. The safety monitoring system of claim 1 wherein the safety determinative aspect is regarding an aerial lift platform component of the mobile work vehicle, and the target object sensor unit is configured to determine that the operating condition of the safety determinative aspect is (i) an unoccupied status when the aerial lift platform component is unoccupied by a worker, and (ii) an occupied status when the aerial lift platform component is occupied by a worker.

9. The safety monitoring system of claim 1 wherein the safety determinative aspect is regarding an aerial lift platform protection attachment component of the mobile work vehicle, and the target object sensor unit is configured to determine that the operating condition of the safety determinative aspect is (i) a secured status when a protection device is engaged with the aerial lift platform protection attachment component, and (ii) an unsecured status when the protection device is not engaged with the aerial lift platform protection component.

10. The safety monitoring system of claim 1 wherein the safety determinative aspect is regarding a stabilization component of the mobile work vehicle, and the target object sensor unit is configured to determine that the operating condition of the safety determinative aspect is (i) a non-deployed status when the stabilization component is not deployed to stabilize the mobile work vehicle, and (ii) a deployed status when the stabilization component is deployed to stabilize the mobile work vehicle.

11. The safety monitoring system of claim 1 wherein the DACU further comprises:
an electronic control unit reader (ECU reader) that is configured to receive electronic control unit (ECU) communications from an ECU that controls the mobile work vehicle, the ECU communications containing vehicle data regarding motor vehicle operation characteristics of the mobile work vehicle, wherein the DACU is further configured to generate driver and vehicle behavior data based on the vehicle data.

12. The safety monitoring system of claim 1 wherein the DACU further comprises:
a motion-sensitive sensor configured to detect at least one of motion, acceleration, and orientation of the mobile work vehicle, and generate sensor data based on the at least one of motion, acceleration, and orientation of the mobile work vehicle detected, the DACU being further configured to generate the safety status data based on the sensor data.

13. The safety monitoring system of claim 1, further comprising:
a second target object sensor unit attached to the mobile work vehicle, wherein the safety determinative aspect is regarding detection of an electromagnetic field near a second location on the mobile work vehicle, the second target object sensor unit being configured to measure an electromagnetic field near the second target object sensor unit, and the second target object sensor unit is configured to determine the operating condition of the safety determinative aspect as (i) a high risk status when the electromagnetic field measured equals or exceeds a predetermined field threshold, and (ii) a low risk status when the electromagnetic field measured is less than the predetermined field threshold.

14. The safety monitoring system of claim 1, further comprising:
a second target object sensor unit attached to the mobile work vehicle, wherein the safety determinative aspect is regarding detection of wind conditions at a second location on the mobile work vehicle, the second target object sensor unit being configured to measure a wind velocity, and the second target object sensor is configured to determine the operating condition of the safety determinative aspect is (i) a high wind status when the measured wind velocity equals or exceeds a predetermined wind threshold, and (ii) a low wind status when the measured wind velocity is less than the predetermined wind threshold.

15. The safety monitoring system of claim 1 wherein the server computing device is configured to store the safety status data and generate safety statistics based on safety status data of the mobile work vehicle aggregated over a period of time.

16. The safety monitoring system of claim 1 wherein the server computing device is configured to generate and transmit third party notifications to communication devices of persons not assigned to the mobile work vehicle.

17. The safety monitoring system of claim 1, further comprising:
a load-bearing lanyard for providing fall protection to a user, the lanyard configured to attach to an attachment component of the mobile work vehicle to provide fall protection for the user, wherein one of the first component and the second component is united with the lanyard and the other of the first component and the second component is attached to the mobile work vehicle at a location adjacent to the attachment component, and the second component is configured to emit a signal and the first component is configured to detect the signal emitted from the first device to determine the proximity.

18. The safety monitoring system of claim 17, wherein the second component includes a magnetic component configured to emit an electromagnetic field, and the first component includes a magnetic sensor unit configured to measure a characteristic of the electromagnetic field, and determination of the proximity is based at least in part on the characteristic measured.

19. The safety monitoring system of claim 1, wherein the target object sensor unit is a self-powered unit.

20. The safety monitoring system of claim 1, wherein the target object sensor unit further comprises a wireless transmitter configured to wirelessly transmit data to the data acquisition and communication unit.

21. A method of monitoring the safety of a mobile work vehicle, comprising:
transmitting, from a target object sensor unit attached to the mobile work vehicle at a first location on the mobile work vehicle, condition data regarding an operating condition of a safety determinative aspect of the mobile work vehicle, the condition data indicating detection of a proximity between a first component and a second component of the target object sensor unit, at least one of the first component and the second component being configured to be selectively affixed to a location on or associated with the mobile work vehicle, and the proximity of the second component to the first component being detected without contact between the first component and the second component;
receiving the condition data at a data acquisition/communication unit (DACU) attached to a second location of the mobile work vehicle;
processing, in the DACU, the condition data to generate safety status data regarding the safety determinative aspect;
associating the safety status data with vehicle identification information of the mobile work vehicle; and
wirelessly transmitting the safety status data and associated vehicle identification information to a remote server computing device.

22. The method of claim 21, further comprising:
analyzing the safety status data to determine a safety status of the mobile work vehicle;
generating a safety status notification responsive to determining that the safety status corresponds to an unsafe condition;
transmitting the safety status notification to a notification device; and
generating, responsive to receiving the safety status notification, a notification signal alerting a worker proximate to or in the mobile work vehicle.

23. The method of claim 22, further comprising:
receiving location information regarding a location of the mobile work vehicle, processing the location information to generate the safety status data, and the safety status is determined as an unsafe status if the safety status data indicates that the mobile work vehicle has remained at a work location for a time period equal to or exceeding a predetermined threshold time period.

24. The method of 22, further comprising:
receiving motion data regarding movement characteristics of the mobile work vehicle, processing the motion data to generate the safety status data, and the safety status is determined as an unsafe status if the safety status data indicates that the mobile work vehicle (i) accelerates or decelerates at a rate equal to or exceeding a predetermined threshold rate; (ii) reached a speed equal to or exceeding a predetermined threshold speed; or (iii) is operated for a time period equal to or exceeding a predetermined threshold time period.

25. The method of claim 21, further comprising:
transmitting, from a second target object sensor unit attached to a second location on the mobile work vehicle, second condition data indicating a second operating condition regarding a second safety determinative aspect of the mobile work vehicle;
receiving the second condition data at the DACU;
wherein processing the second condition data to generate the safety status data.

26. The method of claim 25, further comprising:
analyzing the safety status data to determine a safety status of the mobile work vehicle;
generating a safety status notification responsive to determining that the safety status corresponds to an unsafe condition;
transmitting the safety status notification to a notification device; and
generating, responsive to receiving the safety status notification, a notification signal alerting a worker proximate to or in the mobile work vehicle.

27. The method of claim 25 wherein the condition data includes data regarding measurement of an electromagnetic field near the target object sensor unit,
wherein the second safety determinative aspect is risk of electric shock near a second target object sensor unit, and
wherein the safety status generated indicates (i) a high risk status when the electromagnetic field measured equals or exceeds a predetermined field threshold, and (ii) a low risk status when the electromagnetic field measured is less than the predetermined field threshold,
the method further comprising:
generating a notification signal alerting a worker proximate to or in the mobile work vehicle responsive to determining that the operating condition is the high risk status.

28. The method of claim 25 wherein the safety determinative aspect is regarding whether a worker in an operational aerial lift component of the mobile work vehicle is protected,
wherein the condition data indicates an operating condition of an aerial lift,
wherein the second condition data indicates a protection status of a protection device of a worker on an aerial lift platform of the aerial lift,
wherein the safety status data indicates (i) a secured status when the protection status of the protection device is a protected state, and (ii) an unsecured status when the protection status of the protection device is an unprotected state, and
wherein the safety status indicates (i) a non-operational status when the aerial lift is not elevated, and (ii) an operational status when the aerial lift is elevated,
the method further comprising:
analyzing the safety status data to determine a safety status of the mobile work vehicle;
generating a notification signal alerting a worker proximate to or in the mobile work vehicle responsive to determining that the safety status data indicates the unsecured status and the operational status.

29. The method of claim 25 wherein the condition data includes wind speed data indicating a wind speed near the mobile work vehicle;
wherein the second safety determinative aspect is risk of aerial lift topple, and
the safety status data indicates (i) a high wind topple risk status when the wind speed data indicates a wind speed equal to or exceeding a predetermined wind speed threshold, and (ii) a low wind topple risk status when the wind speed data indicates a wind speed less than the predetermined wind speed threshold.

30. The method of claim 25 further comprising:
generating mobile work vehicle motion data indicating at least one of a motion, an acceleration, and a vertical orientation of the mobile work vehicle, the vertical orientation of the mobile work vehicle being an angle of vertical orientation with respect to a direction of gravity,
wherein the second safety determinative aspect is risk of aerial lift topple,
processing the mobile work vehicle motion data to generate the safety status data regarding the second safety determinative aspect, and
the safety status data indicates (i) a high vehicle instability status when the mobile indicates that the mobile work vehicle is moving or the vertical orientation of the mobile work vehicle equals or exceeds a predetermined threshold angle, and (ii) a low vehicle instability status when the mobile work vehicle is static and the vertical orientation is less than the predetermined threshold angle.

31. The method of claim 25 wherein the condition data includes stabilization component data regarding a position of a stabilization component on the mobile work vehicle, the stabilization component data indicating a non-deployed position of the stabilization component when the stabilization component is not deployed from a main body of the mobile work vehicle, and the stabilization component data indicating a deployed position of the stabilization component when the stabilization component is deployed from the main body,
wherein the second safety determinative aspect is risk of aerial lift topple, and
the safety status data indicates (i) a non-deployed status when the stabilization component data indicates that the stabilization is in the non-deployed position, and (ii) a deployed status when the stabilization component data indicates that the stabilization is in the deployed state.

32. The method of claim 21 wherein the safety determinative aspect is detection of a tool on the mobile work vehicle, and
wherein the safety status data generated indicates (i) an equipped status where the tool is detected to be located on the mobile work vehicle, and (ii) an unequipped status where the tool is not detected to be located on the mobile work vehicle,
the method further comprising:
generating a notification signal alerting a worker proximate to or in the mobile work vehicle responsive to determining that the operating condition is the unequipped state.

33. The method of claim 21, further comprising:
receiving weather data regarding weather conditions local to or approaching a location of the mobile work vehicle, and processing the weather data to generate the safety status data regarding a second safety determinative aspect.

34. A safety monitoring system for monitoring the safety of a mobile work vehicle, comprising:
a target object sensor unit comprising a communications transmitter, a first component and a second component, at least one of the first component and the second component being configured to be selectively affixed to a location on or associated with the mobile work vehicle, wherein the first component is configured to determine a proximity of the second component to the first component without contact between the first component and the second component, the target object sensor unit being configured to monitor a safety determinative aspect of the mobile work vehicle, the target object sensor unit being further configured to (i) determine an operating condition of the safety determinative aspect, (ii) generate condition data regarding the operating condition, and (iii) transmit the condition data from the communications transmitter;
a data acquisition/communication unit (DACU) comprising a first processor, a condition data storage device, and a first network interface device configured to couple the DACU to a communications network, the DACU being configured to attach to a second location on the mobile work vehicle, the DACU being further configured to generate safety status data indicating a safety condition of the safety determinative aspect based on the condition data received from the target object sensor unit, and further configured to transmit the safety status data; and
a notification device comprising a communications receiver configured to receive the safety status data from the DACU, configured to generate a notification signal alerting a worker proximate to or in the mobile work vehicle, and configured to generate the notification signal responsive to receiving the safety status data indicating that the operating condition corresponds to an existing or potential unsafe condition regarding the safety determinative aspect.

35. The safety monitoring system of claim 34, further comprising:
a load-bearing lanyard for providing fall protection to a user, the lanyard configured to attach to an attachment component of the mobile work vehicle to provide fall protection for the user, wherein one of the first component and the second component is united with the lanyard and the other of the first component and the second component is attached to the mobile work vehicle at a location adjacent to the attachment component, and the second component is configured to emit a signal and the first component is configured to detect the signal emitted from the first device to determine the proximity.

36. The safety monitoring system of claim 35, wherein the second component includes a magnetic component configured to emit an electromagnetic field, and the first component includes a magnetic sensor unit configured to measure a characteristic of the electromagnetic field, and determination of the proximity is based at least in part on the characteristic measured.

37. A lanyard safety detection system comprising:
a load-bearing lanyard for providing fall protection to a user, the lanyard configured to attach to an attachment component of an object to provide fall protection for the user;
a first sensor device coupled to the lanyard; and
a second sensor device external to the lanyard and configured to selectively attach to the object, the first sensor device configured to interact with the second sensor device to determine a non-contact proximity of the first sensor device to the second sensor device and provide an indication of safety based at least in part on detection of the non-contact proximity, wherein one of the first and second sensor devices is configured to emit a signal and the other of the first and second sensor devices is configured to detect the signal emitted from the signal emitting device, the non-contact proximity being determined based at least in part on the signal detecting device determining that the signal emitted satisfies a predetermined condition.

38. The lanyard of claim 37, wherein the signal emitting device includes a magnetic component for emitting an electromagnetic field, and the signal detecting device including a magnetic sensor unit configured to measure a characteristic of the electromagnetic field, and determination of the non-contact proximity is based at least in part on the characteristic measured.

* * * * *